(12) United States Patent
Varadarajan et al.

(10) Patent No.: US 10,084,996 B1
(45) Date of Patent: Sep. 25, 2018

(54) METHODS AND APPARATUS FOR CONTROLLED SHADOW CASTING TO INCREASE THE PERCEPTUAL QUALITY OF PROJECTED CONTENT

(71) Applicant: Intel Corporation, Santa Clara, CA (US)

(72) Inventors: Srenivas Varadarajan, Bangalore (IN); Selvakumar Panneer, Hillsboro, OR (US); Carl S. Marshall, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/640,026

(22) Filed: Jun. 30, 2017

(51) Int. Cl.
*H04N 9/31* (2006.01)

(52) U.S. Cl.
CPC ......... *H04N 9/3155* (2013.01); *H04N 9/3147* (2013.01)

(58) Field of Classification Search
CPC .... G03B 21/26; G03B 21/147; G03B 21/206; G03B 21/2053; H04N 5/33; H04N 5/335; H04N 5/357; H04N 5/2254; H04N 5/2259; H04N 5/3572; H04N 9/3155; H04N 9/3185; H04N 9/3188; G01T 1/295; G01T 1/1603
See application file for complete search history.

(56) References Cited

U.S. PATENT DOCUMENTS 8,955,981 B2 * 2/2015 Morikuni ........... G02B 17/0896
   353/100
9,357,156 B2 * 5/2016 Sakaguchi ........... H04N 5/7458

OTHER PUBLICATIONS

Insafutdinov et al., "DeeperCut: A Deeper, Stronger, and Faster Multi-Person Pose Estimation Model," arXiv: 1605.03170v3 [cs.CV], Nov. 30, 2016, 22 pages.
Yang et al., "Perceptual Quality Assessment of Screen Content Images," IEEE Transactions on Image Processing, vol. 24, No. 11, Nov. 2015, 14 pages.

* cited by examiner

*Primary Examiner* — Sultan Chowdhury
(74) *Attorney, Agent, or Firm* — Hanley, Flight & Zimmerman, LLC

(57) ABSTRACT

Methods and apparatus for controlled shadow casting to increase the perceptual quality of projected content are disclosed. In some examples, an apparatus is to increase a perceptual quality of content projected onto a projection surface. In some examples, the apparatus includes a shutter position determiner to determine a target shutter position for a shutter based on a location of a light source and a location of the projection surface. In some disclosed examples, the apparatus further includes a shutter controller to move the shutter to the target shutter position to cast a shadow onto the projection surface around a portion of the content projected onto the projection surface.

20 Claims, 8 Drawing Sheets

US 10,084,996 B1

METHODS AND APPARATUS FOR CONTROLLED SHADOW CASTING TO INCREASE THE PERCEPTUAL QUALITY OF PROJECTED CONTENT

FIELD OF THE DISCLOSURE

This disclosure relates generally to methods and apparatus for projecting content and, more specifically, to methods and apparatus for controlled shadow casting to increase the perceptual quality of projected content.

BACKGROUND

Projectors (e.g., digital projectors) are commonly used to project content (e.g., images and/or videos including text and/or graphics) onto a projection surface (e.g., a screen, a wall, etc.). The perceptual quality associated with content projected onto a projection surface via a projector may be undesirable and/or less than ideal in well-lit environments (e.g., an environment exposed to ambient and/or artificial light emitted from one or more natural or man-made light source(s)). For example, an audience (e.g., one or more human(s)) exposed to content projected onto a projection surface within a well-lit environment via a projector may find viewing and/or interpreting the projected content to be a difficult task.

Figure 1:
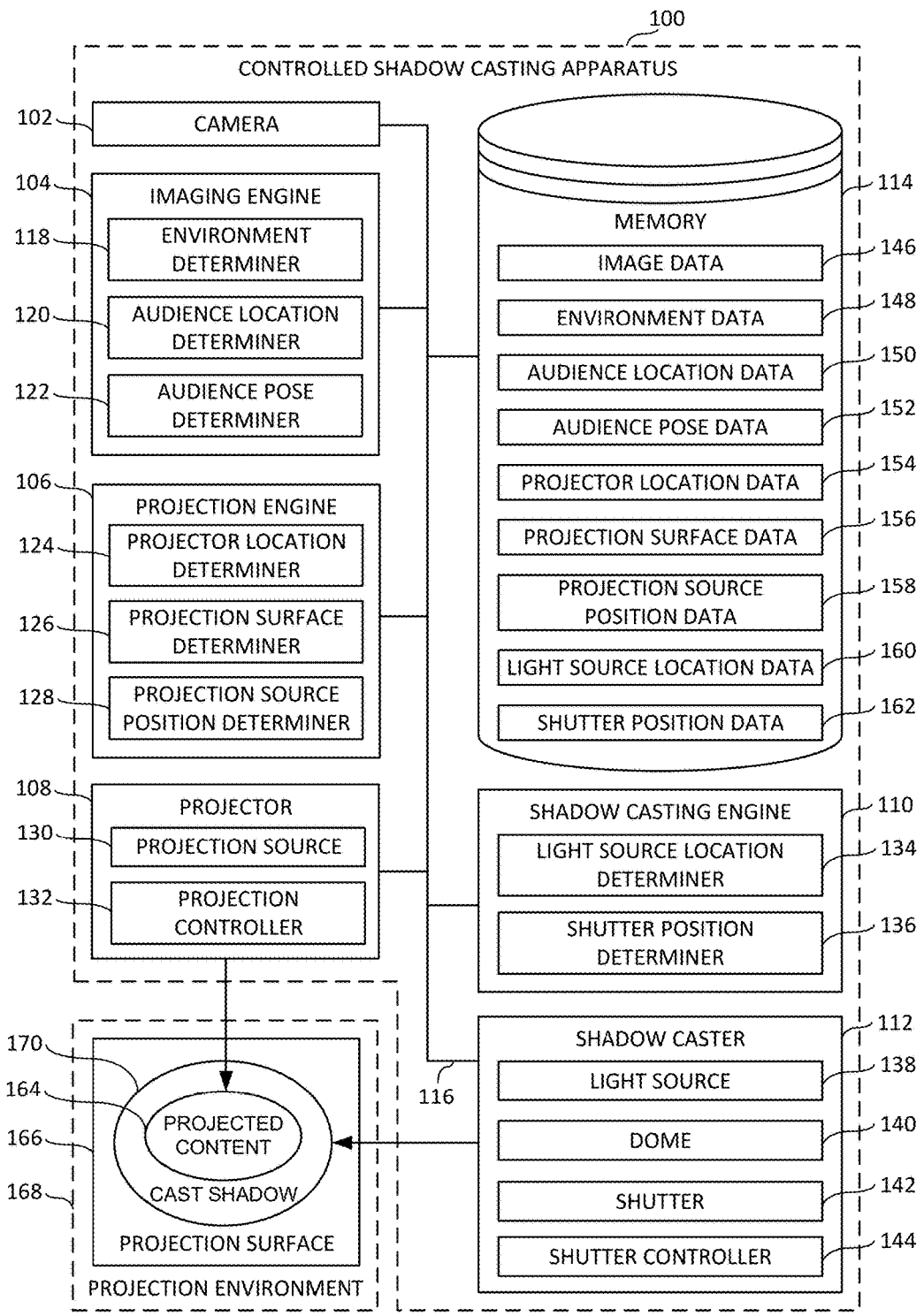
FIG. 1 is a block diagram of an example controlled shadow casting apparatus constructed in accordance with the teachings of this disclosure.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

DETAILED DESCRIPTION

The perceptual quality associated with content (e.g., images and/or videos including text and/or graphics) projected onto a projection surface (e.g., a screen, a wall, etc.) via a projector (e.g., a digital projector) depends to a great extent on the local contrast of the projected content relative to the projection surface. For example, the perceptual quality associated with content projected onto a projection surface via a projector may be undesirable and/or less than ideal in a well-lit environment (e.g., an environment exposed to ambient and/or artificial light emitted from one or more natural or man-made light source(s)). In some instances, an audience (e.g., one or more human(s)) exposed to content projected onto a projection surface within a well-lit environment via a projector may find viewing and/or interpreting the projected content to be a difficult task.

As used herein, the term "projection environment" refers to an environment (e.g., a geographical area and/or region, such as a room) including one or more projection surface(s) onto which a projector is to project content. The projector that is to project the content onto the projection surface(s) may be located within the projection environment, or may alternatively be located remotely from (e.g., outside of and/or beyond the bounds of) the projection environment. Known methods for increasing the perceptual quality of projected content include reducing the level of ambient and/or artificial lighting in a projection environment (e.g., projecting content in a darkened room, such as a movie theatre), increasing the intensity of the light being projected by the projector relative to the ambient and/or artificial lighting in the projection environment, and increasing the reflective properties of the projection surface within the projection environment (e.g., by applying reflective paint to the projection surface). The implementation of any or all of these known methods for increasing the perceptual quality of projected content has/have substantial drawbacks.

For example, reducing the level of ambient and/or artificial lighting in a projection environment may be undesirable when the projected content is to be associated with a setting and/or a task that requires a well-lit environment (e.g., cooking a meal in a kitchen). As another example, increasing the intensity of the light being projected by the projector requires a corresponding increase in the amount of power being supplied to the projector, which detracts from the energy efficiency associated with the projector. As yet another example, increasing the reflective properties associated with every potential projection surface within a projection environment may prove to be a cumbersome and costly task.

In contrast to the known methods for increasing the perceptual quality of projected content described above, the example methods and apparatus disclosed herein increase the perceptual quality of projected content via implementation of controlled shadow casting relative to the projected content. The disclosed methods and apparatus for controlled shadow casting reduce (e.g., eliminate) many of the drawbacks associated with the known methods for increasing the perceptual quality of projected content described above. For example, the disclosed methods and apparatus for controlled shadow casting advantageously increase the perceptual quality of projected content without the need for darkening the projection environment, without the need for increasing the intensity of the light projected by the projector, and without the need for increasing the reflective properties of any projections surfaces onto which the projected content is to be projected.

FIG. 1 is a block diagram of an example controlled shadow casting apparatus 100 constructed in accordance with the teachings of this disclosure. The example controlled shadow casting apparatus 100 of FIG. 1 includes an example camera 102, an example imaging engine 104, an example projection engine 106, an example projector 108, an example shadow casting engine 110, an example shadow caster 112, and an example memory 114. In the illustrated example of FIG. 1, some or all of these components are in communication and/or operatively coupled via an example bus 116. The imaging engine 104 of FIG. 1 includes an example environment determiner 118, an example audience location determiner 120, and an example audience pose determiner 122. The projection engine 106 of FIG. 1 includes an example projector location determiner 124, an example projection surface determiner 126, and an example projection source position determiner 128. The projector 108 of FIG. 1 includes an example projection source 130 and an example projection controller 132. The shadow casting engine 110 of FIG. 1 includes an example light source location determiner 134 and an example shutter position determiner 136. The shadow caster 112 of FIG. 1 includes an example light source 138, an example dome 140, an example shutter 142, and an example shutter controller 144. The memory 114 of FIG. 1 stores example image data 146, example environment data 148, example audience location data 150, example audience pose data 152, example projector location data 154, example projection surface data 156, example projection source position data 158, example light source location data 160, and example shutter position data 162.

Other example implementations of the controlled shadow casting apparatus 100 may include fewer or additional structures relative to the example camera 102, the example imaging engine 104, the example projection engine 106, the example projector 108, the example shadow casting engine 110, the example shadow caster 112, the example memory 114, the example environment determiner 118, the example audience location determiner 120, the example audience pose determiner 122, the example projector location determiner 124, the example projection surface determiner 126, the example projection source position determiner 128, the example projection source 130, the example projection controller 132, the example light source location determiner 134, the example shutter position determiner 136, the example light source 138, the example dome 140, the example shutter 142, and the example shutter controller 144. In the illustrated example of FIG. 1, any or all of the example imaging engine 104, the example projection engine 106, the example shadow casting engine 110, the example environment determiner 118, the example audience location determiner 120, the example audience pose determiner 122, the example projector location determiner 124, the example projection surface determiner 126, the example projection source position determiner 128, the example projection controller 132, the example light source location determiner 134, the example shutter position determiner 136, and the example shutter controller 144 may disposed on a printed circuit board (PCB).

As further described herein, the controlled shadow casting apparatus 100 of FIG. 1 projects and/or displays example projected content 164 onto an example projection surface 166 located within an example projection environment 168. The controlled shadow casting apparatus 100 increases the perceptual quality of the projected content 164 by controlling an example cast shadow 170 relative to the location of the projected content 164 such that the projection of the cast shadow 170 onto the projection surface 166 surrounds, covers and/or overlays at least a portion of the projected content 164 displayed on the projection surface 166. The projected content 164 of FIG. 1 may include any type of static data (e.g., image data) and/or dynamic data (e.g., video data) of a textual and/or graphical nature.

The example camera 102 of FIG. 1 captures images and/or videos including, for example, images and/or videos of the example projection environment 168 (e.g., a geographical area, a room). In some examples, the camera 102 may be located within the projection environment 168. In other examples, the camera 102 may be located remotely from (e.g., outside of and/or beyond the bounds of) the projection environment 168. In some examples, the camera 102 may be implemented as a single camera (e.g., a fish-eye camera) configured to capture images and/or video of the projection environment 168. In other examples, the camera 102 may be implemented as a plurality of cameras (e.g., surveillance cameras) that are collectively configured to capture images and/or video of the projection environment 168.

In the illustrated example of FIG. 1, images and/or videos captured via the camera 102 are stored in the form of example image data 146 within the memory 114 of the controlled shadow casting apparatus 100 of FIG. 1. In other examples, images and/or videos captured by the camera 102 may additionally and/or alternatively be stored (e.g., in the same form or a different form as the image data 146) at a remote server and/or a cloud server that is/are accessible to the imaging engine 104 and/or, more generally, to the controlled shadow casting apparatus 100 of FIG. 1. The image data 146 corresponding to the images and/or videos captured via the camera 102 may be stored in any file and/or data structure format, organization scheme, and/or arrangement.

The example imaging engine 104 of FIG. 1 controls and/or manages the processing of image data (e.g., the example image data 146) captured by the camera 102. For example, the imaging engine 104 of FIG. 1 may implement one or more computer vision algorithm(s) and/or model(s) via the example environment determiner 118, the example audience location determiner 120, and/or the example audience pose determiner 122 of FIG. 1 to process the image data 146 captured by the camera 102 to identify and/or determine one or more feature(s) associated with the projection environment 168. In some examples, the identified and/or determined feature(s) include one or more structure(s) and/or structural surface(s) (e.g., a wall, a floor, a cabinet, a countertop, a projector, a light source, etc.) associated with (e.g., located within) the projection environment 168. In some examples, the identified and/or determined feature(s) include an audience location (e.g., individual and/or consensus location(s) of one or more human(s)) associated with the projection environment 168. In some examples, the identified and/or determined feature(s) include an audience pose (e.g., individual and/or consensus bodily orientation(s) of an audience) associated with the projection environment 168.

In the illustrated example of FIG. 1, the imaging engine 104 may access and/or obtain the image data 146 from the memory 114 of FIG. 1. In some examples, the imaging engine 104 may be located within the projection environment 168. In other examples, the imaging engine 104 may be located remotely from (e.g., outside of and/or beyond the bounds of) the projection environment 168.

The example environment determiner 118 of the imaging engine 104 of FIG. 1 identifies, detects and/or determines, based on the image data 146 captured by the camera 102, the existence and the relative location(s) (e.g., relative to a reference location) of one or more structure(s) and/or structural surface(s) associated with (e.g., located within) the projection environment 168. In some examples, the environment determiner 118 identifies, detects and/or determines the existence and the relative location(s) of the structure(s) and/or structural surface(s) by executing one or more computer vision algorithm(s) and/or model(s) in relation to the image data 146 captured by the camera 102. Example structure(s) and/or structural surface(s) identified, detected and/or determined by the environment determiner 118 of the imaging engine 104 may include a wall, a floor, a ceiling, an item of furniture, a window furnishing, a cabinet, a countertop, a screen, a projector, a light source, etc.

In the illustrated example of FIG. 1, the existence and the relative location(s) of the structure(s) and/or structural surface(s) identified, detected and/or determined by the environment determiner 118 of the imaging engine 104 are stored in the form of example environment data 148 within the memory 114 of the controlled shadow casting apparatus 100 of FIG. 1. In other examples, the existence and the relative location(s) of the structure(s) and/or structural surface(s) identified, detected and/or determined by the environment determiner 118 of the imaging engine 104 may additionally and/or alternatively be stored (e.g., in the same form or a different form as the environment data 148) at a remote server and/or a cloud server that is/are accessible to the imaging engine 104, the projection engine 106, and/or the shadow casting engine 110 of FIG. 1, and/or, more generally, to the controlled shadow casting apparatus 100 of FIG. 1. The environment data 148 corresponding to the existence and the relative location(s) of the structure(s) and/or structural surface(s) identified, detected and/or determined by the environment determiner 118 of the imaging engine 104 may be stored in any file and/or data structure format, organization scheme, and/or arrangement. In some examples, the environment data 148 may include, for respective ones of the identified, detected and/or determined structures and/or structural surfaces, a type attribute (e.g., a wall, a countertop, a projector, a light source, etc.), a size attribute, a location attribute, and/or an orientation attribute.

The example audience location determiner 120 of the imaging engine 104 of FIG. 1 identifies, detects and/or determines, based on the image data 146 captured by the camera 102, the existence and relative location(s) (e.g., relative to a reference location) of an audience (e.g., one or more human(s)) associated with the projection environment 168. In some examples, the audience location determiner 120 identifies, detects and/or determines the existence and the relative location(s) of the audience by executing one or more computer vision algorithm(s) and/or model(s) in relation to the image data 146 captured by the camera 102. In some examples, the audience identified, detected and/or determined by the audience location determiner 120 may include only a single human. In other examples, the audience identified, detected and/or determined by the audience location determiner 120 may include multiple humans. In such multi-human audience examples, the audience location determiner 120 of the imaging engine 104 may identify, detect and/or determine the existence and the relative location(s) of the audience either on an individual basis (e.g., a member-by-member basis), or on an aggregated basis (e.g., an aggregated and/or pooled member basis) in which the respective relative locations of the individual audience members are compiled and averaged to identify, detect and/or determine a consensus location of the audience relative to (e.g., within) the projection environment 168.

In the illustrated example of FIG. 1, the existence and the relative location(s) of the audience identified, detected and/or determined by the audience location determiner 120 of the imaging engine 104 are stored in the form of example audience location data 150 within the memory 114 of the controlled shadow casting apparatus 100 of FIG. 1. In other examples, the existence and the relative location(s) of the audience identified, detected and/or determined by the audience location determiner 120 of the imaging engine 104 may additionally and/or alternatively be stored (e.g., in the same form or a different form as the audience location data 150) at a remote server and/or a cloud server that is/are accessible to the imaging engine 104, the projection engine 106, and/or the shadow casting engine 110 of FIG. 1, and/or, more generally, to the controlled shadow casting apparatus 100 of FIG. 1. The audience location data 150 corresponding to the existence and the relative location(s) of the audience identified, detected and/or determined by the audience location determiner 120 of the imaging engine 104 may be stored in any file and/or data structure format, organization scheme, and/or arrangement. In some examples, the audience location data 150 may include a location attribute for respective ones of the identified, detected and/or determined audience members.

In instances where the example audience location determiner 120 of FIG. 1 identifies, detects and/or determines the existence of an audience associated with the projection environment 168, the example audience pose determiner 122 of the imaging engine 104 of FIG. 1 identifies, detects and/or determines, based on the image data 146 captured by the camera 102, individual and/or consensus pose(s) (e.g., bodily orientation(s)) of the member(s) of the audience associated with the projection environment 168. In some examples, the audience pose determiner 122 identifies, detects and/or determines the pose(s) of the member(s) of the audience by executing one or more computer vision algorithm(s) and/or model(s) in relation to the image data 146 captured by the camera 102. In single-human audience examples (e.g., examples where the identified and/or detected audience includes only a single human), the audience pose determiner 122 of the imaging engine 104 may identify, detect and/or determine the pose of the audience based on the bodily orientation of the single member of the audience. In multi-human audience examples (e.g., examples where the identified and/or detected audience includes multiple humans), the audience pose determiner 122 of the imaging engine 104 may identify, detect and/or determine the pose(s) of the audience either on an individual basis (e.g., a member-by-member basis), or on an aggregated basis (e.g., an aggregated and/or pooled member basis) in which the respective poses (e.g., bodily orientations) of the individual audience members are compiled and averaged to identify, detect and/or determine a consensus pose of the audience relative to the projection environment 168.

In the illustrated example of FIG. 1, the pose(s) of the member(s) of the audience identified, detected and/or determined by the audience pose determiner 122 of the imaging engine 104 are stored in the form of example audience pose data 152 within the memory 114 of the controlled shadow casting apparatus 100 of FIG. 1. In other examples, the pose(s) of the member(s) of the audience identified, detected and/or determined by the audience pose determiner 122 of the imaging engine 104 may additionally and/or alternatively be stored (e.g., in the same form or a different form as the audience pose data 152) at a remote server and/or a cloud server that is/are accessible to the imaging engine 104, the projection engine 106, and/or the shadow casting engine 110 of FIG. 1, and/or, more generally, to the controlled shadow casting apparatus 100 of FIG. 1. The audience pose data 152 corresponding to the pose(s) of the member(s) of the audience identified, detected and/or determined by the audience pose determiner 122 of the imaging engine 104 may be stored in any file and/or data structure format, organization scheme, and/or arrangement. In some examples, the audience pose data 152 may include a pose attribute (e.g., a bodily orientation attribute) for respective ones of the identified, detected and/or determined audience members.

Figure 2:
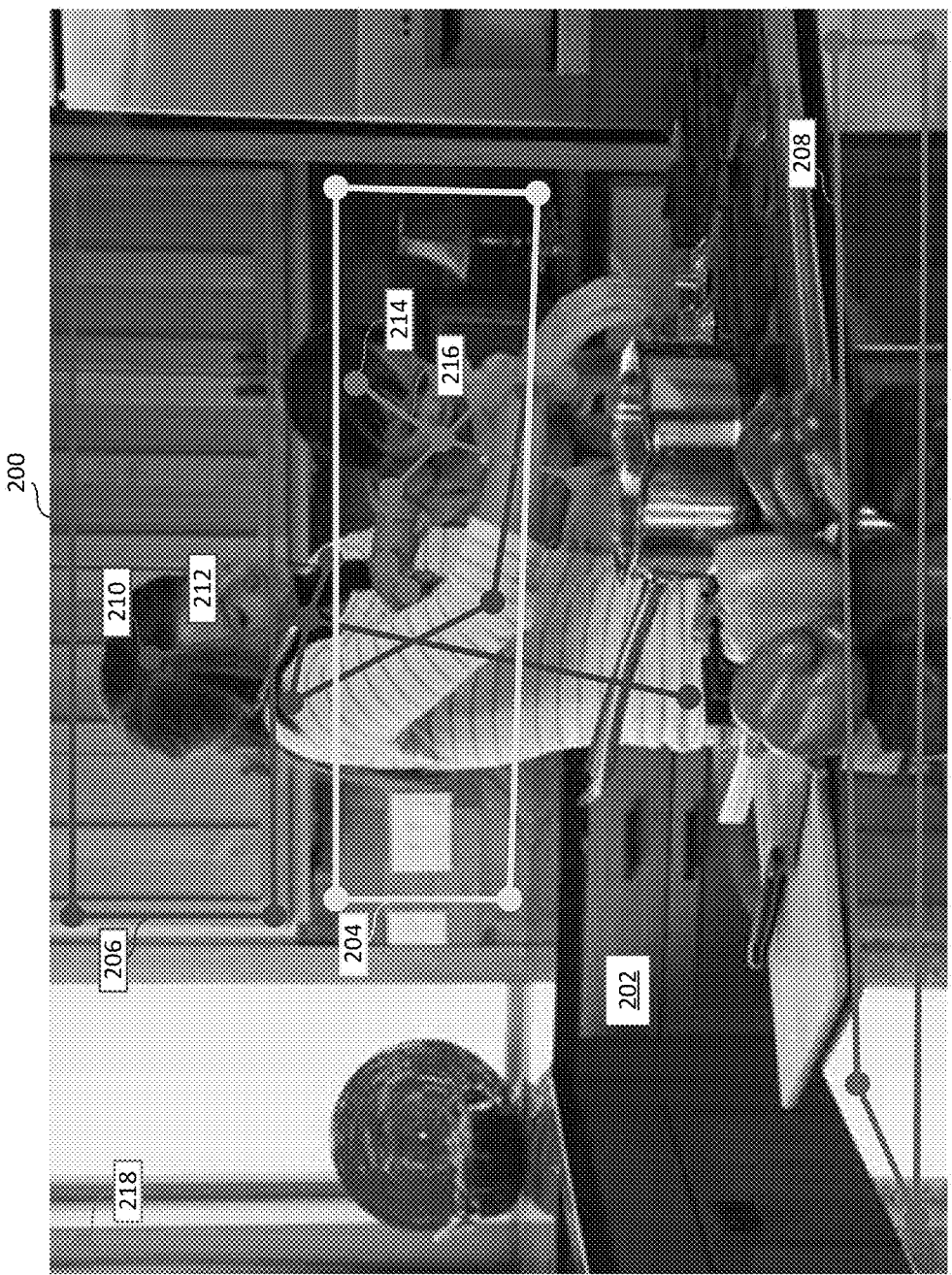
FIG. 2 illustrates an example captured image being processed by the example imaging engine of the example controlled shadow casting apparatus of FIG. 1.

FIG. 2 illustrates an example captured image 200 being processed by the example imaging engine 104 of the example controlled shadow casting apparatus 100 of FIG. 1. In the illustrated example of FIG. 2, the captured image 200 depicts an example kitchen area 202 corresponding to the example projection environment 168 of FIG. 1 from which the captured image 200 was taken and/or obtained via the camera 102 of FIG. 1. The example kitchen area 202 of FIG. 2 includes an example wall surface 204, an example cabinet surface 206, an example countertop surface 208, a first example audience member 210 positioned in a first example audience member pose 212, and a second example audience member 214 positioned in a second example audience member pose 216.

In the illustrated example of FIG. 2, the example environment determiner 118 of the example imaging engine 104 of FIG. 1 identifies and/or detects the wall surface 204, the cabinet surface 206, and the countertop surface 208, and also identifies and/or determines the respective locations of the wall surface 204, the cabinet surface 206, and the countertop surface 208 relative to an example reference point 218 located within the example kitchen area 202 of FIG. 2. The example audience location determiner 120 of the example imaging engine 104 of FIG. 1 identifies and/or detects the first audience member 210 and the second audience member 214, and also identifies and/or determines the respective locations of the first audience member 210 and the second audience member 214 relative to the reference point 218. The example audience pose determiner 122 of the example imaging engine 104 of FIG. 1 identifies and/or detects the first audience member pose 212 (e.g., the bodily orientation of the first audience member 210) and the second audience member pose 216 (e.g., the bodily orientation of the second audience member 214) relative to the reference point 218.

Returning to the illustrated example of FIG. 1, the example projection engine 106 of FIG. 1 controls and/or manages the identification and/or determination of the example projection surface 166 of FIG. 1 onto which the example projected content 164 of FIG. 1 is to be projected and/or displayed. For example, the projection engine 106 of FIG. 1 may implement one or more algorithm(s) and/or model(s) via the example projector location determiner 124 and/or the example projection surface determiner 126 of FIG. 1 to identify and/or determine the projection surface 166 based on the example environment data 148 associated with the projection environment 168 of FIG. 1, the example audience location data 150 associated with the projection environment 168 of FIG. 1, the example audience pose data 152 associated with the projection environment 168 of FIG. 1, and/or the example projector location data 154 associated with the projector 108 of FIG. 1.

The example projection engine 106 of FIG. 1 also controls and/or manages the identification and/or determination of the target position to which the example projection source 130 of the example projector 108 of FIG. 1 is to be moved to project and/or display the example projected content 164 of FIG. 1 onto the example projection surface 166 of FIG. 1. For example, the projection engine 106 of FIG. 1 may implement one or more algorithm(s) and/or model(s) via the example projector location determiner 124, the example projection surface determiner 126, and/or the example projection source position determiner 128 of FIG. 1 to identify and/or determine the target position to which the projection source 130 of FIG. 1 is to be moved based on the example environment data 148 associated with the projection environment 168 of FIG. 1, the example projector location data 154 associated with the example projector 108 of FIG. 1, and/or the example projection surface data 156 associated with the projection environment 168 of FIG. 1. In the illustrated example of FIG. 1, the projection engine 106 may access and/or obtain the environment data 148, the audience location data 150, the audience pose data 152, the projector location data 154, and/or the projection surface data 156 from the memory 114 of FIG. 1.

In some examples, the projection surface 166 identified and/or determined by the projection engine 106 of FIG. 1 corresponds to one of the structural surface(s) (e.g., a wall, a floor, a countertop, etc.) identified and/or determined by the environment determiner 118 of the imaging engine 104 of FIG. 1. In some examples, the projection engine 106 may be located within the projection environment 168 of FIG. 1. In other examples, the projection engine 106 may be located remotely from (e.g., outside of and/or beyond the bounds of) the projection environment 168 of FIG. 1. In some examples, the projection engine 106 may be located within (e.g., as an integral component of) the projector 108 of FIG. 1. In other examples, the projection engine 106 may be located remotely from (e.g., outside of and/or beyond the bounds of) the projector 108 of FIG. 1.

The example projector location determiner 124 of the projection engine 106 of FIG. 1 identifies, detects and/or determines a location of a projector relative to a projection environment (e.g., relative to a reference location associated with the projection environment). For example, the projector location determiner 124 may identify, detect and/or determine the location of the example projector 108 of FIG. 1 relative to the projection environment 168 of FIG. 1. In some examples, the projector location determiner 124 identifies, detects and/or determines the location of the projector 108 based on the example environment data 148. For example, the environment data 148 may include an identified location of the projector 108 in examples where the projector 108 is depicted within the example image data 146 processed by the environment determiner 118 of the imaging engine 104 of FIG. 1. In such examples, the projector location determiner 124 may identify, detect and/or determine the location of the projector 108 by querying and/or searching the example environment data 148.

In other examples, the location of the projector 108 may not be included within the example environment data 148 (e.g., in examples where the projector 108 is not depicted within the example image data 146 processed by the environment determiner 118 of the imaging engine 104 of FIG. 1). In such other examples, the location of the projector 108 may be known to and/or stored by the projector 108 itself, or may alternatively be stored in the form of example projector location data 154 within the memory 114 of the controlled shadow casting apparatus 100 of FIG. 1. In such other examples, the projector location determiner 124 of FIG. 1 identifies, detects and/or determines the location of the projector 108 by requesting that the projector 108 transmit its location to the projector location determiner 124 and/or the memory 114, and/or by accessing the example projector location data 154 from the memory 114. The projector location data 154 corresponding to the location of the projector 108 may be stored in any file and/or data structure format, organization scheme, and/or arrangement. In some examples, the projector location data 154 may include a location attribute and/or an orientation attribute for the identified, detected and/or determined projector (e.g., the projector 108 of FIG. 1).

The example projection surface determiner 126 of the projection engine 106 of FIG. 1 identifies, detects and/or determines a projection surface onto which content is to be projected and/or displayed. For example, the projection surface determiner 126 may identify, detect and/or determine the example projection surface 166 of FIG. 1 onto which the example projected content 164 of FIG. 1 is to be projected and/or displayed. The projection surface determiner 126 identifies, detects and/or determines the projection surface 166 based on the example environment data 148 associated with the projection environment 168, the example audience location data 150 associated with the projection environment 168, the example audience pose data 152 associated with the projection environment 168, and/or the example projector location data 154 associated with the projector 108 of FIG. 1.

In some examples, the projection surface determiner 126 of FIG. 1 identifies, detects and/or determines a list and/or group of candidate projection surfaces based on, and/or corresponding to, the structural surface(s) included within the example environment data 148. For example, a list and/or group of candidate projection surfaces identified, detected and/or determined by the projection surface determiner 126 may include one or more wall surface(s), floor surface(s), countertop surface(s), cabinet surface(s), etc. corresponding to the various structural surface(s) identified, detected and/or determined by the environment determiner 118 of the imaging engine 104 of FIG. 1 and stored as the environment data 148 of FIG. 1. For example, in connection with the illustrated example of FIG. 2 described above, a list and/or group of candidate projection surfaces identified, detected and/or determined by the projection surface determiner 126 of FIG. 1 may include the example wall surface 204, the example cabinet surface 206, and the example countertop surface 208 of FIG. 2.

Returning to the illustrated example of FIG. 1, in some examples, the projection surface determiner 126 of FIG. 1 implements one or more algorithm(s) and/or model(s) to analyze respective ones of the candidate projection surfaces to identify, detect and/or determine a suitable projection surface from among the candidate projection surfaces onto which the projector 108 of FIG. 1 is to project content. In some examples, the projection surface determiner 126 may determine the suitability of a candidate projection surface based on whether a projector (e.g., the projector 108 of FIG. 1) associated with the projection environment 168 of FIG. 1 is capable of projecting and/or displaying content onto the candidate projection surface. For example, the projection surface determiner 126 may determine that a candidate projection surface is a suitable projection surface if projection capabilities (e.g., rotate, tilt, pan, and/or zoom capabilities) associated with the projection source 130 of the projector 108 of FIG. 1 and known by and/or accessible to the projection surface determiner 126 enable, based on the environment data 148 and/or the projector location data 154, the projection source 130 of the projector 108 to project and/or display content onto the candidate projection surface. In making such a determination, the projection surface determiner 126 may take potential obstructions (e.g., an obstruction arising as a result of one or more structure(s) positioned between the location of the projector 108 and the location of the candidate projection surface) into consideration.

In some examples, the projection surface determiner 126 of FIG. 1 may additionally determine the suitability of the candidate projection surface based on whether an audience associated with the projection environment 168 of FIG. 1 is capable of viewing the content to be projected and/or displayed on the candidate projection surface (e.g., as indicated based on the location and/or the pose (e.g., the bodily orientation) of the audience relative to the location of the candidate projection surface). For example, the projection surface determiner 126 may determine that the candidate projection surface is a suitable projection surface if, based on the environment data 148, the audience location data 150, the audience pose data 152, and/or the projector location data 154, the audience is located in a position and/or posed in a bodily orientation that enable(s) the audience to view the content to be projected by the projection source 130 of the projector 108 onto the candidate projection surface. In connection with the illustrated example of FIG. 2 described above, for example, the projection surface determiner 126 of FIG. 1 may identify, detect and/or determine the example countertop surface 208 of FIG. 2 as a suitable (e.g., the most suitable) projection surface from among the example wall surface 204, the example cabinet surface 206, and the example countertop surface 208 of FIG. 2 based in part on the identified and/or determined locations of the first example audience member 210 positioned in the first example audience member pose 212 of FIG. 2, and the second example audience member 214 positioned in the second example audience member pose 216 of FIG. 2. In making such a determination, the projection surface determiner 126 may take potential obstructions (e.g., an obstruction arising as a result of one or more structure(s) positioned between the location of the audience and the location of the candidate projection surface) into consideration.

Returning to the illustrated example of FIG. 1, in some examples, the projection surface determiner 126 of FIG. 1 may analyze respective ones of the candidate projection surfaces until the projection surface determiner 126 has identified, detected and/or determined a suitable projection surface from among the respective candidate surfaces. In such examples, the projection surface determiner 126 identifies the suitable projection surface as the projection surface (e.g., the projection surface 166 of FIG. 1) onto which the projection source 130 of the projector 108 of FIG. 1 is to project and/or display content (e.g., the projected content 164 of FIG. 1). In other examples, the projection surface determiner 126 may analyze respective ones of the candidate projection surfaces until the projection surface determiner 126 has identified, detected and/or determined all suitable projection surfaces from among the respective candidate surfaces. In such other examples, the projection surface determiner 126 may implement one or more optimization algorithm(s) and/or model(s) to determine a most suitable one of the suitable projection surfaces. In such other examples, the projection surface determiner 126 identifies the most suitable projection surface as the projection surface (e.g., the projection surface 166 of FIG. 1) onto which the projection source 130 of the projector 108 of FIG. 1 is to project and/or display content (e.g., the projected content 164 of FIG. 1). For example, in connection with the illustrated example of FIG. 2 described above, the projection surface determiner 126 of FIG. 1 may identify, detect and/or determine the example countertop surface 208 of FIG. 2 as a suitable (e.g., the most suitable) projection surface from among the example wall surface 204, the example cabinet surface 206, and the example countertop surface 208 of FIG. 2 based in part on the identified and/or determined locations of the first example audience member 210 positioned in the first example audience member pose 212 of FIG. 2, and the second example audience member 214 positioned in the second example audience member pose 216 of FIG. 2.

In the illustrated example of FIG. 1, information corresponding to and/or associated with the projection surface 166 (e.g., the location of the projection surface 166 relative to the projection environment 168 of FIG. 1) identified by the projection surface determiner 126 of FIG. 1 is stored in the form of example projection surface data 156 within the memory 114 of the controlled shadow casting apparatus 100 of FIG. 1. In other examples, information associated with the projection surface 166 identified by the projection surface determiner 126 of FIG. 1 may additionally and/or alternatively be stored (e.g., in the same form or a different form as the projection surface data 156) at a remote server and/or a cloud server that is/are accessible to the projection engine 106, the projector 108, and/or the shadow casting engine 110 of FIG. 1, and/or, more generally, to the controlled shadow casting apparatus 100 of FIG. 1. The projection surface data 156 corresponding to and/or associated with the projection surface 166 identified by the projection surface determiner 126 may be stored in any file and/or data structure format, organization scheme, and/or arrangement. In some examples, the projection surface data 156 may include a type attribute (e.g., a wall, a countertop, a projector, a light source, etc.), a size attribute, a location attribute, and/or an orientation attribute for the identified, detected and/or determined projection surface (e.g., the projection surface 166 of FIG. 1).

In some examples, the projection surface determiner 126 of FIG. 1 may determine that none of the candidate projection surfaces qualify as a suitable projection surface. In such examples, the projection surface determiner 126 and/or the projection engine 106 of FIG. 1 may generate a signal, message and/or request indicating that no suitable projection surface has been identified. In some such examples, the signal message and/or request generated by the projection surface determine 126 and/or the projection engine 106 of FIG. 1 may request that additional and/or updated data (e.g., image data 146, environment data 148, audience location data 150, audience pose data 152, projector location data 154) be provided by the camera 102 of FIG. 1, the imaging engine 104 of FIG. 1, and/or the projector location determiner 124 of FIG. 1.

The example projection source position determiner 128 of the projection engine 106 of FIG. 1 identifies, detects and/or determines a target position to which a projection source of a projector is to be moved to project and/or display projected content onto a projection surface. For example, the projection source position determiner 128 of FIG. 1 may identify, detect and/or determine the target position to which the example projection source 130 of the example projector 108 of FIG. 1 is to be moved to project and/or display the example projected content 164 of FIG. 1 onto the example projection surface 166 of FIG. 1. The projection source position determiner 128 identifies, detects and/or determines the target position to which the projection source 130 of the projector 108 is to be moved based on the example environment data 148 associated with the projection environment 168, the example projector location data 154 associated with the projector 108, and/or the example projection surface data 156 associated with the projection environment 168 of FIG. 1.

In some examples, the projection source position determiner 128 of FIG. 1 identifies, detects and/or determines the target position to which the projection source 130 of the projector 108 is to be moved by identifying, detecting and/or determining a position of the projection source 130 that projects and/or displays the projected content 164 of FIG. 1 onto the projection surface 166 of FIG. 1. In some such examples, the projection source position determiner 128 of FIG. 1 implements one or more optimization algorithm(s) and/or model(s) relative to the available positions of the projection source 130 (e.g., the positions to which the projection source 130 is capable of being moved) to identify, detect and/or determine the most effective target position of the projection source 130 for projecting and/or displaying the projected content 164 of FIG. 1 onto the projection surface 166 of FIG. 1.

In the illustrated example of FIG. 1, information corresponding to and/or associated with the target position to which the projection source 130 of the projector 108 is to be moved, as identified and/or determined by the projection source position determiner 128 of FIG. 1, is stored in the form of example projection source position data 158 within the memory 114 of the controlled shadow casting apparatus 100 of FIG. 1. In other examples, information corresponding to and/or associated with the target position to which the projection source 130 of the projector 108 is to be moved, as identified and/or determined by the projection source position determiner 128 of FIG. 1, may additionally and/or alternatively be stored (e.g., in the same form or a different form as the projection source position data 158) at a remote server and/or a cloud server that is/are accessible to the projection engine 106 and/or the projector 108 of FIG. 1, and/or, more generally, to the controlled shadow casting apparatus 100 of FIG. 1. The projection source position data 158 corresponding to and/or associated with the target position to which the projection source 130 of the projector 108 is to be moved may be stored in any file and/or data structure format, organization scheme, and/or arrangement. In some examples, the projection source position data 158 may include a target location attribute and/or a target orientation attribute for the associated projection source and/or projector (e.g., the projection source 130 of the projector 108 of FIG. 1).

The example projector 108 of FIG. 1 projects and/or displays content onto a projection surface located within a projection environment. For example, the projector 108 may project and/or display the example projected content 164 of FIG. 1 onto the example projection surface 166 of FIG. 1 located within the example projection environment 168 of FIG. 1. In some examples, the projector 108 of FIG. 1 may be implemented as a digital projector capable of projecting and/or displaying digital content (e.g., digital images and/or digital videos including textual and/or graphical information). In some examples, the projector 108 of FIG. 1 may be located within the projection environment 168 of FIG. 1. In other examples, the projector 108 may be located remotely from (e.g., outside of and/or beyond the bounds of) the projection environment 168.

The projector 108 of FIG. 1 projects and/or displays content via the example projection source 130 of FIG. 1. The projection source 130 may be implemented as a projection lens operatively coupled to and/or operatively aligned with a projection lamp. In the illustrated example of FIG. 1, the projection source 130 of the projector 108 is movable, steerable and/or otherwise positionable relative to the projector 108 and/or relative to the projection environment 168 of FIG. 1. For example, the orientation of the projection source 130 relative to the projection environment 168 may change as the orientation of the projector 108 relative to the projection environment 168 changes (e.g., as a result of the projector 108 rotating relative to the projection environment 168). As another example, the position of the projection source 130 relative to the projector 108 and/or relative to the projection environment 168 may change as a result of the projection source 130 being tilted, panned and/or zoomed relative to the projector 108 and/or relative to the projection environment 168.

The example projection controller 132 of FIG. 1 controls the position and/or orientation of the projection source 130 and/or, more generally, the projector 108 of FIG. 1. In the illustrated example of FIG. 1 the projection controller 132 causes the projection source 130 of the projector 108 to project and/or display the projected content 164 onto the projection surface 166 based on the projection source position data 158 identified and/or determined by the projection source position determiner 128 of the projection engine 106 of FIG. 1. For example, the projection controller 132 may adjust, move and/or otherwise change the position and/or orientation of the projection source 130 from a current position and/or orientation to a target position and/or orientation determined by the projection controller 132 from the projection source position data 158.

In response to the projection controller 132 adjusting and/or moving the position and/or orientation of the projection source 130 (e.g., by tilting, panning, zooming and/or rotating the projection source 130) from the current position and/or orientation to the target position and/or orientation, the projection source 130 of FIG. 1 is positioned and/or oriented relative to the projection environment 168 of FIG. 1 to project and/or display the projected content 164 of FIG. 1 onto the projection surface 166 of FIG. 1. In some examples, the projection controller 132 may access the projection source position data 158 from the memory 114 of FIG. 1. In other examples, the projection source position determiner 128 and/or, more generally, the projection engine 106 of FIG. 1 may transmit and/or otherwise communicate the projection source position data 158 to the projection controller 132 and/or, more generally, the projector 108 of FIG. 1.

The example shadow casting engine 110 of FIG. 1 controls and/or manages the identification and/or determination of the target position to which the example shutter 142 of the example shadow caster 112 of FIG. 1 is to be moved to project and/or cast the example cast shadow 170 of FIG. 1 onto the example projection surface 166 of FIG. 1 around a portion of the example projected content 164 of FIG. 1. For example, the shadow casting engine 110 of FIG. 1 may implement one or more algorithm(s) and/or model(s) via the example light source location determiner 134 and/or the example shutter position determiner 136 of FIG. 1 to identify and/or determine the target position to which the shutter 142 of FIG. 1 is to be moved based on the example environment data 148 associated with the projection environment 168 of FIG. 1, the example projection surface data 156 associated with the projection environment 168 of FIG. 1, and/or the example light source location data 160 associated with the example light source 138 and/or the example shadow caster 112 of FIG. 1. In the illustrated example of FIG. 1, the shadow casting engine 110 may access and/or obtain the environment data 148, the projection surface data 156, and/or the light source location data 160 from the memory 114 of FIG. 1.

In some examples, the shadow casting engine 110 may be located within the projection environment 168 of FIG. 1. In other examples, the shadow casting engine 110 may be located remotely from (e.g., outside of and/or beyond the bounds of) the projection environment 168 of FIG. 1. In some examples, the shadow casting engine 110 may be located within (e.g., as an integral component of) the shadow caster 112 of FIG. 1. In other examples, the shadow casting engine 110 may be located remotely from (e.g., outside of and/or beyond the bounds of) the shadow caster 112 of FIG. 1.

The example light source location determiner 134 of the shadow casting engine 110 of FIG. 1 identifies, detects and/or determines a location of a light source relative to a projection environment (e.g., relative to a reference location associated with the projection environment). For example, the light source location determiner 134 may identify, detect and/or determine the location of the example light source 138 of FIG. 1 relative to the projection environment 168 of FIG. 1. In some examples, the light source location determiner 134 identifies, detects and/or determines the location of the light source 138 based on the example environment data 148. For example, the environment data 148 may include an identified location of the light source 138 in examples where the light source 138 is depicted within the example image data 146 processed by the environment determiner 118 of the imaging engine 104 of FIG. 1. In such examples, the light source location determiner 134 may identify, detect and/or determine the location of the light source 138 by querying and/or searching the example environment data 148.

In other examples, the location of the light source 138 may not be included within the example environment data 148 (e.g., in examples where the light source 138 is not depicted within the example image data 146 processed by the environment determiner 118 of the imaging engine 104 of FIG. 1). In such other examples, the location of the light source 138 may be known to and/or stored by the light source 138 and/or the shadow caster 112 of FIG. 1 itself, or may alternatively be stored in the form of example light source location data 160 within the memory 114 of the controlled shadow casting apparatus 100 of FIG. 1. In such other examples, the light source location determiner 134 of FIG. 1 identifies, detects and/or determines the location of the light source 138 by requesting that the light source 138 and/or the shadow caster 112 of FIG. 1 transmit the location of the light source 138 to the light source location determiner 134 and/or the memory 114, and/or by accessing the example light source location data 160 from the memory 114. The light source location data 160 corresponding to the location of the light source 138 may be stored in any file and/or data structure format, organization scheme, and/or arrangement. In some examples, the light source location data 165 may include a location attribute and/or an orientation attribute for respective ones of the identified, detected and/or determined light sources (e.g., the light source 138 of FIG. 1).

The example shutter position determiner 136 of the shadow casting engine 110 of FIG. 1 identifies, detects and/or determines a target position to which a shutter of a shadow caster is to be moved to project and/or cast a shadow onto a projection surface around a portion of content projected onto the projection surface. For example, the shutter position determiner 136 of FIG. 1 may identify, detect and/or determine the target position to which the example shutter 142 of the example shadow caster 112 of FIG. 1 is to be moved to project and/or cast the example cast shadow 170 of FIG. 1 onto the example projection surface 166 of FIG. 1 around a portion of the example projected content 164 of FIG. 1. The shutter position determiner 136 identifies, detects and/or determines the target position to which the shutter 142 of the shadow caster 112 is to be moved based on the example environment data 148 associated with the projection environment 168, the example projection surface data 156 associated with the projection environment 168, and/or the example light source location data 160 associated with the light source 138 and/or the shadow caster 112 of FIG. 1.

In some examples, the shutter position determiner 136 of FIG. 1 identifies, detects and/or determines the target position to which the shutter 142 of the shadow caster 112 is to be moved by identifying, detecting and/or determining a position of the shutter 142 that projects and/or casts a shadow onto the projection surface 166 of FIG. 1 as a result of the shutter 142 obstructing (e.g., partially blocking) a path of light emitted from the light source 138 of the shadow caster 112 of FIG. 1 and directed toward the projection surface 166 of FIG. 1. In such examples, the identified, detected and/or determined target position of the shutter 142 is located between the location of the light source (e.g., as identified based on the light source location data 160) and the location of the projection surface 166 (e.g., as identified based on the projection surface data 156). In some such examples, the shutter position determiner 136 of FIG. 1 implements one or more optimization algorithm(s) and/or model(s) relative to the available positions of the shutter 142 (e.g., the positions to which the shutter 142 is capable of being moved) to identify, detect and/or determine the most effective target position of the shutter 142 relative to the light source 138 such that the resultant cast shadow 170 of FIG. 1 provided by the shadow caster 112 of FIG. 1 surrounds, covers and/or overlays as much of the projected content 164 displayed on the projection surface 166 as may be possible (e.g., preferably the entirety of the projected content 164) in view of the available positions of the shutter 142 of the shadow caster 112.

In the illustrated example of FIG. 1, information corresponding to and/or associated with the target position to which the shutter 142 of the shadow caster 112 is to be moved, as identified and/or determined by the shutter position determiner 136 of FIG. 1, is stored in the form of example shutter position data 162 within the memory 114 of the controlled shadow casting apparatus 100 of FIG. 1. In other examples, information corresponding to and/or associated with the target position to which the shutter 142 of the shadow caster 112 is to be moved, as identified and/or determined by the shutter position determiner 136 of FIG. 1, may additionally and/or alternatively be stored (e.g., in the same form or a different form as the shutter position data 162) at a remote server and/or a cloud server that is/are accessible to the shadow casting engine 110 and/or the shadow caster 112 of FIG. 1, and/or, more generally, to the controlled shadow casting apparatus 100 of FIG. 1. The shutter position data 162 corresponding to and/or associated with the target position to which the shutter 142 of the shadow caster 112 is to be moved may be stored in any file and/or data structure format, organization scheme, and/or arrangement. In some examples, the shutter position data 162 may include a target location attribute and/or a target orientation attribute for the associated shutter and/or shadow caster (e.g., the shutter 142 of the shadow caster 112 of FIG. 1).

The example shadow caster 112 of FIG. 1 projects and/or casts a shadow onto a projection surface located within a projection environment. For example, the shadow caster 112 may project and/or cast the example cast shadow 170 of FIG. 1 onto the example projection surface 166 of FIG. 1 located within the example projection environment 168 of FIG. 1. In some examples, the cast shadow 170 projected and/or cast by the shadow caster 112 of FIG. 1 is to surround, cover, and/or overlay at least a portion, and preferably the entirety, of the example projected content 164 of FIG. 1 that is to be projected and/or displayed onto the projection surface 166 of FIG. 1 via the projector 108 of FIG. 1. In some examples, the shadow caster 112 of FIG. 1 may be located within the projection environment 168 of FIG. 1. In other examples, the shadow caster 112 may be located remotely from (e.g., outside of and/or beyond the bounds of) the projection environment 168. Although only a single shadow caster (e.g., the shadow caster 112) is shown in the illustrated example of FIG. 1, the controlled shadow casting apparatus 100 of FIG. 1 may include any number of shadow casters implemented in a manner that is structurally and/or functionally similar (e.g., identical) to that of the example shadow caster 112 of FIG. 1 described herein.

The shadow caster 112 of FIG. 1 is controllable to project and/or cast a shadow (e.g., the cast shadow 170 of FIG. 1) based on the position and/or orientation of the example shutter 142 of the shadow caster 112 relative to the position and/or orientation of the example light source 138 of the shadow caster 112. The example light source 138 of the shadow caster 112 of FIG. 1 may be implemented as any type of artificial light including, for example, a track-mounted light bulb, a can and/or recessed light bulb, a lamp, etc. The example dome 140 of the shadow caster 112 of FIG. 1 is coupled to and/or positioned relative to (e.g., partially around) the light source 138 of the shadow caster. The dome 140 may be implemented as a transparent material that allows light emitted by the light source 138 of the shadow caster 112 to pass though the dome 140 without being obstructed and/or blocked. The dome 140 of FIG. 1 may be of any shape including, for example, a sphere, a hemisphere, a curved structure, etc.

The example shutter 142 of the shadow caster 112 of FIG. 1 is coupled to and/or positioned on the dome 140 of the shadow caster 112. For example, the shutter 142 may be coupled to and/or positioned on an inner surface (e.g., a surface facing toward the light source 138) or an outer surface (e.g., a surface facing away from the light source 138) of the dome 140, or may be positioned and/or contained between an inner surface and an outer surface of the dome 140. The shutter 142 of FIG. 1 is movable and/or positionable relative to the light source 138 and/or the dome 140 of the shadow caster 112. For example, the shutter 142 may be equipped with feet and/or drive wheels in contact with the dome 140 of the shadow caster 112 that, when actuated by the example shutter controller 144 of the shadow caster 112 of FIG. 1, cause the shutter 142 to move along the dome 140 in a specified direction. As another example, the shutter 142 may be coupled to one or more linkage arm(s) that, when actuated by the example shutter controller 144 of the shadow caster 112 of FIG. 1, cause(s) the shutter 142 to move along the dome 140 in a specified direction. The shutter 142 of FIG. 1 may be implemented as a non-transparent and/or light-blocking material that obstructs and/or blocks light emitted by the light source 138 of the shadow caster 112 from passing through the shutter 142. The shutter 142 may be of any shape including, for example, a circular shape, an elliptical shape, a rectangular shape, etc.

The example shutter controller 144 of FIG. 1 controls the position and/or orientation of the shutter 142 and/or, more generally, the shadow caster 112 of FIG. 1. In the illustrated example of FIG. 1 the shutter controller 144 causes the shutter 142 and/or, more generally, the shadow caster 112 to project and/or cast a shadow (e.g., the cast shadow 170 of FIG. 1) onto the projection surface 166 of FIG. 1 based on the shutter position data 162 identified and/or determined by the shutter position determiner 136 of the shadow casting engine 110 of FIG. 1. For example, the shutter controller 144 may adjust, move and/or otherwise change the position and/or orientation of the shutter 142 from a current position and/or orientation to a target position and/or orientation determined by the shutter controller 144 from the shutter position data 162.

In response to the shutter controller 144 adjusting and/or moving the position and/or orientation of the shutter 142 from the current position and/or orientation to the target position and/or orientation, the shutter 142 of FIG. 1 is positioned and/or oriented relative to the light source 138 of the shadow caster 112 of FIG. 1 to project and/or cast the cast shadow 170 of FIG. 1 around at least a portion, and preferably the entirety, of the projected content 164 of FIG. 1 to be projected and/or displayed onto the projection surface 166 of FIG. 1. In some examples, the shutter controller 144 may access the shutter position data 162 from the memory 114 of FIG. 1. In other examples, the shutter position determiner 136 and/or, more generally, the shadow casting engine 110 of FIG. 1 may transmit and/or otherwise communicate the shutter position data 162 to the shutter controller 144 and/or, more generally, the shadow caster 112 of FIG. 1.

Figure 3:
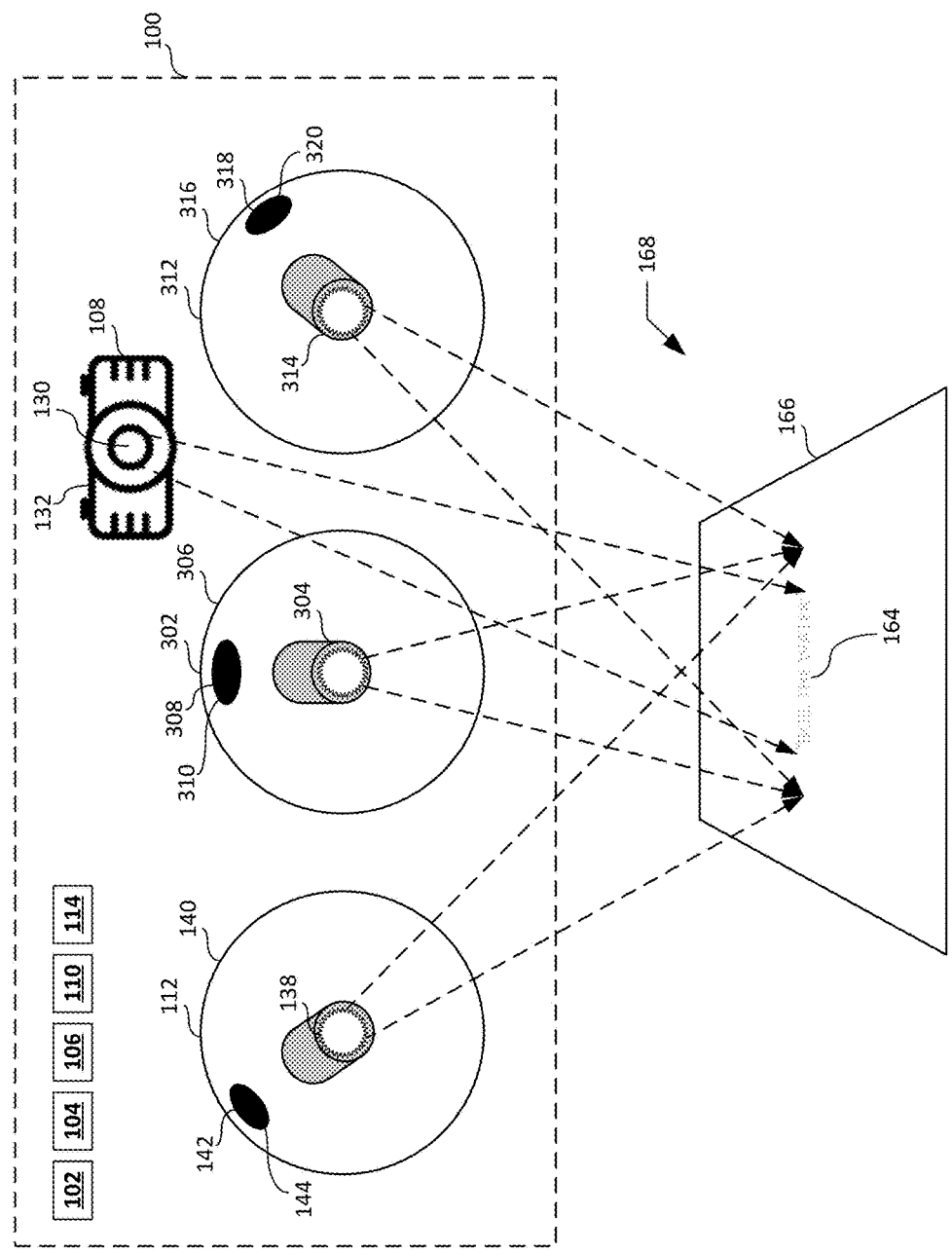
FIG. 3 illustrates the example controlled shadow casting apparatus of FIG. 1 projecting and/or displaying the example projected content of FIG. 1 onto the example projection surface of FIG. 1 located within the example projection environment of FIG. 1.
Figure 4:
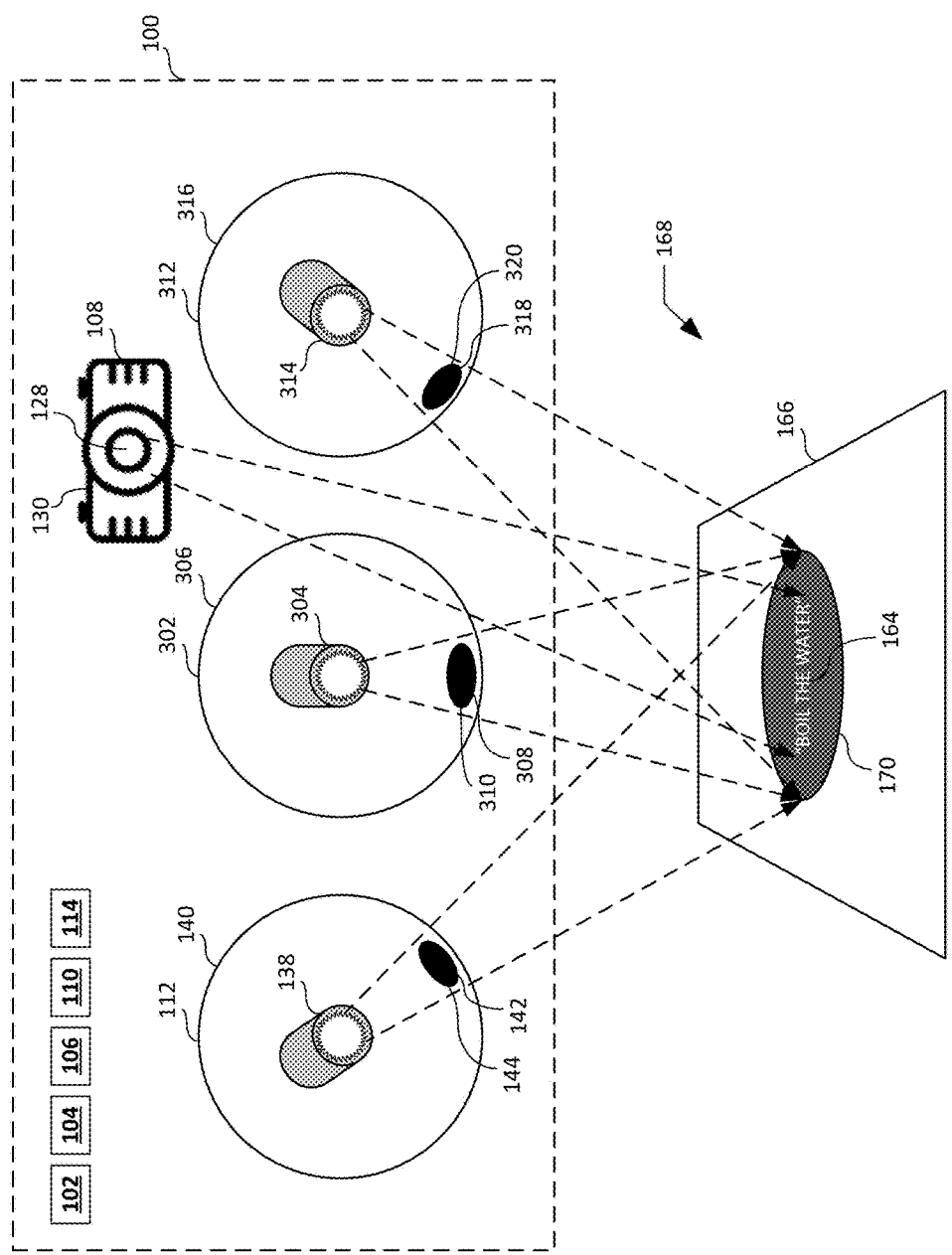
FIG. 4 illustrates the example controlled shadow casting apparatus of FIGS. 1 and 3 projecting and/or casting the example cast shadow of FIG. 1 onto the example projection surface of FIGS. 1 and 3 around a portion of the example projected content of FIGS. 1 and 3 to increase the perceptual quality of the example projected content.

FIG. 3 illustrates the example controlled shadow casting apparatus 100 of FIG. 1 projecting and/or displaying the example projected content 164 of FIG. 1 onto the example projection surface 166 of FIG. 1 located within the example projection environment 168 of FIG. 1. FIG. 4 illustrates the example controlled shadow casting apparatus 100 of FIGS. 1 and 3 projecting and/or casting the example cast shadow 170 of FIG. 1 onto the example projection surface 166 of FIGS. 1 and 3 around a portion of the example projected content 164 of FIGS. 1 and 3 to increase the perceptual quality of the example projected content 164. In the illustrated examples of FIGS. 3 and 4, the controlled shadow casting apparatus 100 includes the example camera 102, the example imaging engine 104, the example projection engine 106, the example shadow casting engine 110, and the example memory 114 of FIG. 1. The controlled shadow casting apparatus 100 of FIGS. 3 and 4 also includes the example projector 108 of FIG. 1 described above (e.g., including the example projection source 130 of FIG. 1 and the example projection controller 132 of FIG. 1), and the example shadow caster 112 of FIG. 1 described above (e.g., including the example light source 138, the example dome 140, the example shutter 142, and the example shutter controller 144 of FIG. 1).

In the illustrated examples of FIGS. 3 and 4, the controlled shadow casting apparatus 100 further includes a second example shadow caster 302 having a second example light source 304, a second example dome 306, a second example shutter 308, and a second example shutter controller 310, as well as a third example shadow caster 312 having a third example light source 314, a third example dome 316, a third example shutter 318, and a third example shutter controller 320. In the illustrated examples of FIGS. 3 and 4, the structure and function of respective ones of the second shadow caster 302 and the third shadow caster 312, including the respective components thereof, are substantially identical to the structure and function of the shadow caster 112 of FIG. 1 and its respective components.

In the illustrated example of FIG. 3, respective ones of the shutter 142 of the shadow caster 112, the second shutter 308 of the second shadow caster 302, and the third shutter 318 of the third shadow caster 312 are in positions that do not obstruct and/or block respective paths of light being emitted from corresponding respective ones of the light source 138, the second light source 304, and the third light source 314 toward the projection surface 166 of FIG. 3. The paths of light being emitted from the respective ones of the light source 138, the second light source 304, and the third light source 314 accordingly illuminate and/or project onto the projection surface 166 of FIG. 3. As a result of this illumination existing at the projection surface 166 of FIG. 3, the projected content 164 of FIG. 3 (e.g., the phrase "BOIL THE WATER") projected onto and/or displayed at the projection surface 166 of FIG. 3 via the projector 108 of FIG. 3 has a relatively low perceptual quality.

In the illustrated example of FIG. 4, respective ones of the shutter 142 of the shadow caster 112, the second shutter 308 of the second shadow caster 302, and the third shutter 318 of the third shadow caster 312 have been moved via corresponding respective ones of the shutter controller 144 of the shadow caster 112, the second shutter controller 310 of the second shadow caster 302, and the third shutter controller 320 of the third shadow caster 312 into positions that obstruct and/or block portions of the respective paths of light being emitted from corresponding respective ones of the light source 138, the second light source 304, and the third light source 314 toward the projection surface 166 of FIG. 4. Shadows (e.g., the cast shadow 170 of FIGS. 1 and 4) are accordingly projected and/or cast onto the projection surface 166 of FIG. 4 within corresponding respective ones of the paths of light being emitted from the respective ones of the light source 138, the second light source 304, and the third light source 314. As a result of this controlled shadow casting occurring relative to the projection surface 166 of FIG. 4, the projected and/or cast shadows (e.g., the cast shadow 170 of FIGS. 1 and 4) surround, cover, and/or overlay a portion (e.g., the entirety) of the projected content 164 of FIG. 4 (e.g., the phrase "BOIL THE WATER") projected onto and/or displayed at the projection surface 166 of FIG. 4 via the projector 108 of FIG. 4. The presence of the shadows projected and/or cast by the controlled shadow casting apparatus 100 of FIGS. 3 and 4 increases the perceptual quality of the projected content 164 of the example of FIG. 4 relative to the perceptual quality of the projected content 164 of the example of FIG. 3 described above.

Returning to the illustrated example of FIG. 1, the example memory 114 of FIG. 1 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 114 may be stored in any file and/or data structure format, organization scheme, and/or arrangement.

In some examples, the memory 114 of FIG. 1 stores image data (e.g., the image data 146 of FIG. 1) corresponding to images and/or videos captured by the camera 102 of FIG. 1. In some examples, the memory 114 stores environment data (e.g., the environment data 148 of FIG. 1) identified and/or determined by the environment determiner 118 of the imaging engine 104 of FIG. 1. In some examples, the memory 114 stores audience location data (e.g., the audience location data 150 of FIG. 1) identified and/or determined by the audience location determiner 120 of the imaging engine 104 of FIG. 1. In some examples, the memory 114 stores audience pose data (e.g., the audience pose data 152 of FIG. 1) identified and/or determined by the audience pose determiner 122 of the imaging engine 104 of FIG. 1. In some examples, the memory 114 stores projector location data (e.g., the projector location data 154 of FIG. 1) identified and/or determined by the projector location determiner 124 of the projection engine 106 of FIG. 1. In some examples, the memory 114 stores projection surface data (e.g., the projection surface data 156 of FIG. 1) identified and/or determined by the projection surface determiner 126 of the projection engine 106 of FIG. 1. In some examples, the memory 114 stores projection source position data (e.g., the projection source position data 158 of FIG. 1) identified and/or determined by the projection source position determiner 128 of the projection engine 106 of FIG. 1. In some examples, the memory 114 stores light source location data (e.g., the light source location data 160 of FIG. 1) identified and/or determined by the light source location determiner 134 of the shadow casting engine 110 of FIG. 1. In some examples, the memory 114 stores shutter position data (e.g., the shutter position data 162 of FIG. 1) identified and/or determined by the shutter position determiner 136 of the shadow casting engine 110 of FIG. 1.

The memory 114 of FIG. 1 is accessible to the example camera 102, the example imaging engine 104, the example projection engine 106, the example projector 108, the example shadow casting engine 110, the example shadow caster 112, the example environment determiner 118, the example audience location determiner 120, the example audience pose determiner 122, the example projector location determiner 124, the example projection surface determiner 126, the example projection source position determiner 128, the example projection controller 132, the example light source location determiner 134, the example shutter position determiner 136, the example shutter controller 144 and/or, more generally, the example controlled shadow casting apparatus 100 of FIG. 1.

While an example manner of implementing the controlled shadow casting apparatus 100 of FIG. 1 is illustrated in FIGS. 1-4, one or more of the elements, processes and/or devices illustrated in FIGS. 1-4 may be combined, divided, re-arranged, omitted, eliminated and/or implemented in any other way. Further, the example camera 102, the example imaging engine 104, the example projection engine 106, the example projector 108, the example shadow casting engine 110, the example shadow caster 112, the example memory 114, the example environment determiner 118, the example audience location determiner 120, the example audience pose determiner 122, the example projector location determiner 124, the example projection surface determiner 126, the example projection source position determiner 128, the example projection source 130, the example projection controller 132, the example light source location determiner 134, the example shutter position determiner 136, the example light source 138, the example dome 140, the example shutter 142, the example shutter controller 144 and/or, more generally, the example controlled shadow casting apparatus 100 of FIG. 1 may be implemented by hardware, software, firmware and/or any combination of hardware, software and/or firmware. Thus, for example, any of the example camera 102, the example imaging engine 104, the example projection engine 106, the example projector 108, the example shadow casting engine 110, the example shadow caster 112, the example memory 114, the example environment determiner 118, the example audience location determiner 120, the example audience pose determiner 122, the example projector location determiner 124, the example projection surface determiner 126, the example projection source position determiner 128, the example projection source 130, the example projection controller 132, the example light source location determiner 134, the example shutter position determiner 136, the example light source 138, the example dome 140, the example shutter 142, the example shutter controller 144 and/or, more generally, the example controlled shadow casting apparatus 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example camera 102, the example imaging engine 104, the example projection engine 106, the example projector 108, the example shadow casting engine 110, the example shadow caster 112, the example memory 114, the example environment determiner 118, the example audience location determiner 120, the example audience pose determiner 122, the example projector location determiner 124, the example projection surface determiner 126, the example projection source position determiner 128, the example projection source 130, the example projection controller 132, the example light source location determiner 134, the example shutter position determiner 136, the example light source 138, the example dome 140, the example shutter 142, the example shutter controller 144 and/or, more generally, the example controlled shadow casting apparatus 100 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controlled shadow casting apparatus 100 of FIG. 1 may include one or more elements, processes and/or devices in addition to, or instead of, those illustrated in FIGS. 1-4, and/or may include more than one of any or all of the illustrated elements, processes and devices.

Figure 5:
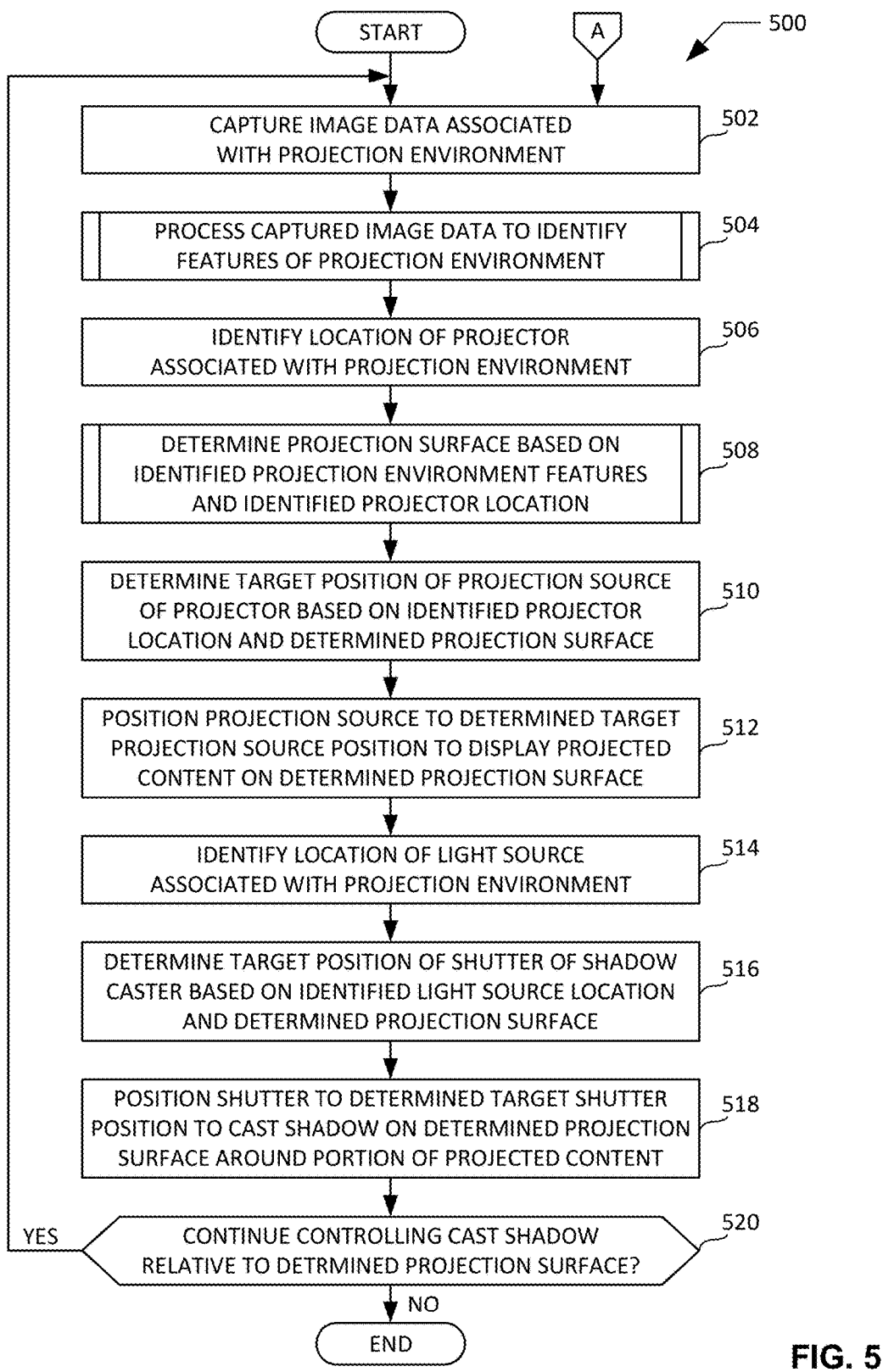
FIG. 5 is a flowchart representative of example machine readable instructions that may be executed at the example controlled shadow casting apparatus of FIG. 1 to implement controlled shadow casting to increase the perceptual quality of projected content.
Figure 6:
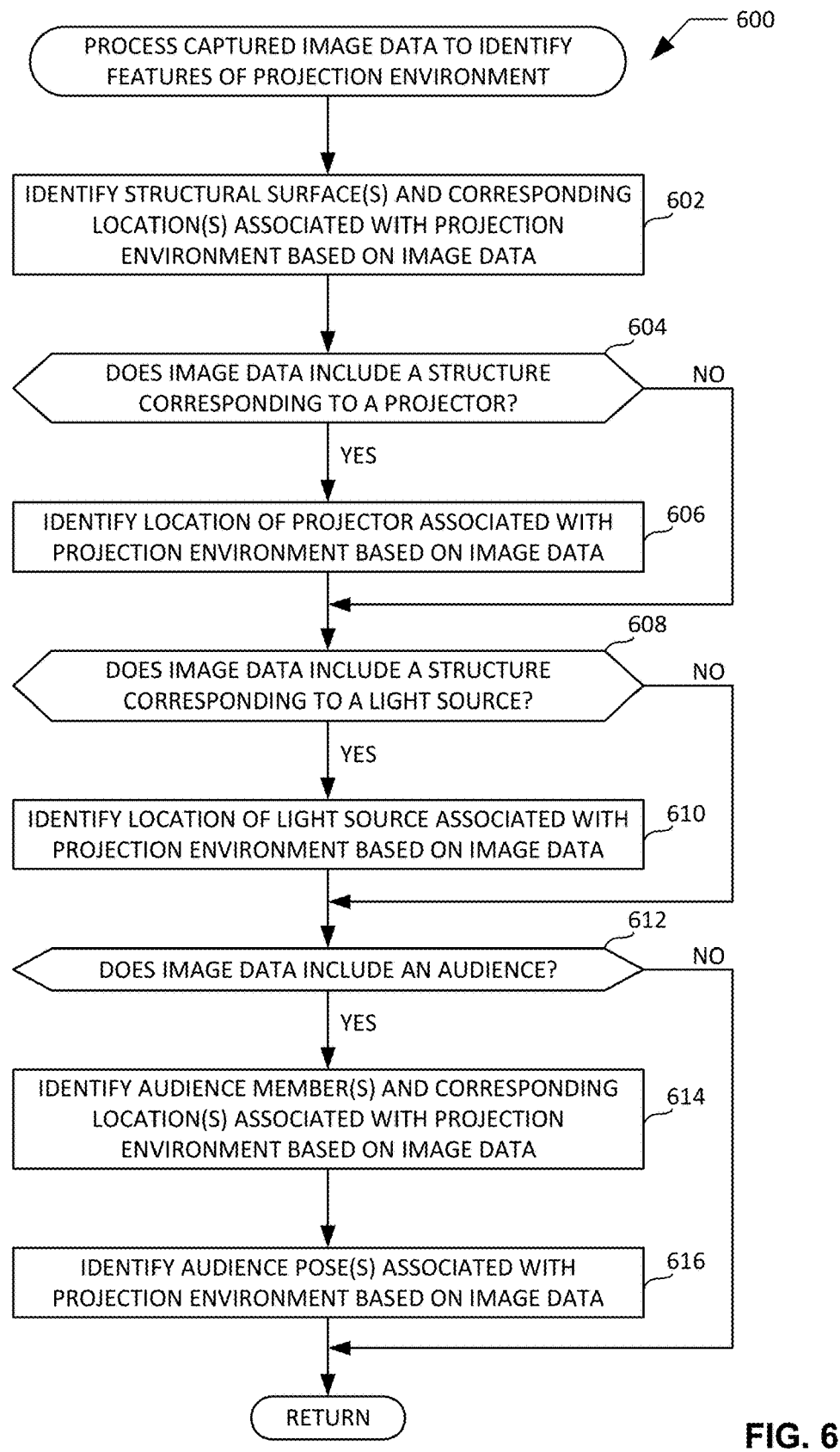
FIG. 6 is a flowchart representative of example machine readable instructions that may be executed at the example controlled shadow casting apparatus of FIG. 1 to process image data to identify features of a projection environment.
Figure 7:
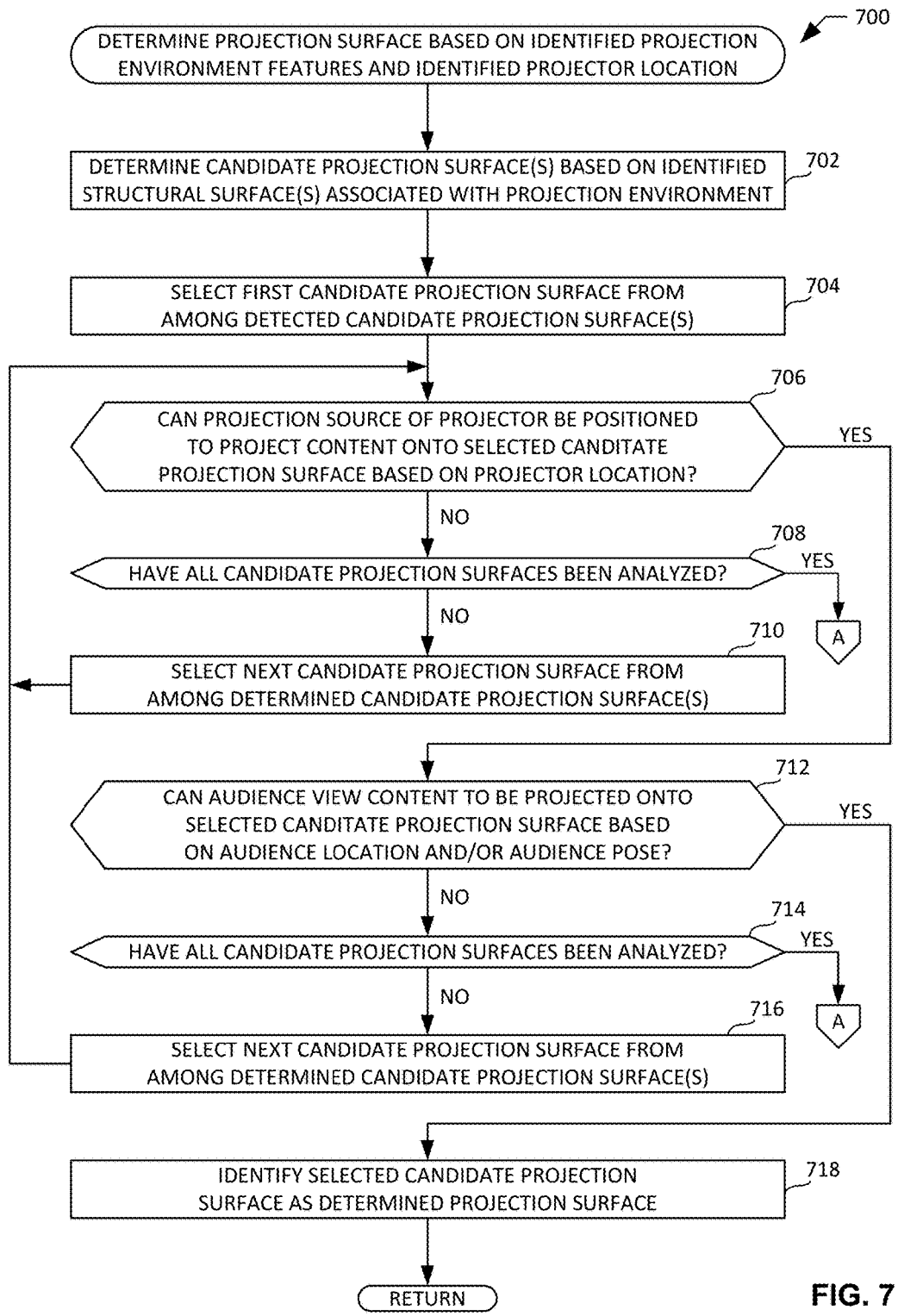
FIG. 7 is a flowchart representative of example machine readable instructions that may be executed at the example controlled shadow casting apparatus of FIG. 1 to determine a projection surface based on identified projection environment features and an identified projector location.

Flowcharts representative of example machine readable instructions for implementing the example controlled shadow casting apparatus 100 of FIG. 1 are shown in FIGS. 5-7. In these examples, the machine readable instructions comprise one or more program(s) for execution by one or more processor(s) such as the processor 802 shown in the example processor platform 800 discussed below in connection with FIG. 8. Each program may be embodied in software stored on a non-transitory computer readable storage medium such as a CD-ROM, a floppy disk, a hard drive, a digital versatile disk (DVD), a Blu-ray disk, or a memory associated with the processor 802, but the entirety of any program and/or parts thereof could alternatively be executed by a device other than the processor 802 and/or embodied in firmware or dedicated hardware. Further, although the example program(s) is/are described with reference to the flowcharts illustrated in FIGS. 5-7, many other methods of implementing the example controlled shadow casting apparatus 100 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 5 is a flowchart representative of example machine readable instructions 500 that may be executed at the example controlled shadow casting apparatus 100 of FIG. 1 to implement controlled shadow casting to increase the perceptual quality of projected content (e.g., the projected content 164 of FIG. 1). The example program 500 begins when the example camera 102 of FIG. 1 captures image data (e.g., the image data 146 of FIG. 1) associated with a projection environment (e.g., the projection environment 168 of FIG. 1) (block 502). In some examples, the image data corresponds to and/or is derived from one or more image(s) and/or video(s) of the projection environment captured by the camera 102 of FIG. 1. Following block 502, control of the example program 500 of FIG. 5 proceeds to block 504.

At block 504, the example imaging engine 104 of FIG. 1 processes the image data captured by the camera 102 of FIG. 1 to identify, detect and/or determine features of the projection environment (e.g., the projection environment 168 of FIG. 1) (block 504). For example, the imaging engine 104 may process, via one or more computer vision algorithm(s) and/or model(s), the image data captured by the camera 102 of FIG. 1 to identify, detect and/or determine the existence and relative location(s) of one or more structure(s) and/or structural surface(s) (e.g., the environment data 148 of FIG. 1) associated with the projection environment, the existence and relative location(s) of one or more audience member(s) (e.g., the audience location data 150 of FIG. 1) associated with the projection environment, and/or the respective pose(s) of any audience member(s) (e.g., the audience pose data 152) associated with the projection environment. An example process that may be used to implement block 504 of the example program 500 of FIG. 5 is described in greater detail below in connection with FIG. 6. Following block 504, control of the example program 500 of FIG. 5 proceeds to block 506.

At block 506, the example projector location determiner 124 of the example projection engine 106 of FIG. 1 identifies, detects and/or determines the location of a projector (e.g., the location of the projector 108 of FIG. 1 defined by and/or associated with the projector location data 154 of FIG. 1) associated with the projection environment (e.g., the projection environment 168 of FIG. 1) (block 506). In some examples, the projector location determiner 124 of FIG. 1 may identify, detect and/or determine the location of the projector based on environment data (e.g., by querying and/or searching the environment data 148 of FIG. 1). In other examples, the projector location determiner 124 of FIG. 1 may identify, detect and/or determine the location of the projector by requesting that the projector transmit its location to the projector location determiner 124 and/or the example memory 114 of FIG. 1, and/or by accessing projector location data (e.g., the projector location data 154 of FIG. 1) from the memory 114 of FIG. 1. Following block 506, control of the example program 500 of FIG. 5 proceeds to block 508.

At block 508, the example projection surface determiner 126 of the example projection engine 106 of FIG. 1 identifies, detects and/or determines a projection surface (e.g., the projection surface 166 of FIG. 1 defined by and/or associated with the projection surface data 156 of FIG. 1) based on the projection environment features (e.g., the environment data 148, the audience location data 150, and/or the audience pose data 152 of FIG. 1) identified, detected and/or determined (e.g., at block 504) by the example imaging engine 104 of FIG. 1, and based on the projector location (e.g., the projector location data 154 of FIG. 1) identified, detected and/or determined (e.g., at block 506) by the example projector location determiner 124 of FIG. 1 (block 508). An example process that may be used to implement block 508 of the example program 500 of FIG. 5 is described in greater detail below in connection with FIG. 7. Following block 508, control of the example program 500 of FIG. 5 proceeds to block 510.

At block 510, the example projection source position determiner 128 of the example projection engine 106 of FIG. 1 identifies, detects and/or determines a target position of a projection source of a projector (e.g., a target position of the projection source 130 of the projector 108 of FIG. 1) based on the projector location (e.g., the projector location data 154 of FIG. 1) identified, detected and/or determined (e.g., at block 506) by the example projector location determiner 124 of FIG. 1, and based on the projection surface (e.g., the projection surface 166 of FIG. 1 defined by and/or associated with the projection surface data 156 of FIG. 1) identified, detected and/or determined (e.g., at block 508) by the example projection surface determiner 126 of FIG. 1 (block 510). In some examples, the projection source position determiner 128 of FIG. 1 generates projection source position data (e.g., the projection source position data 158 of FIG. 1) corresponding to the target position of the projection source 130 identified, detected and/or determined by the projection source position determiner 128. Following block 510, control of the example program 500 of FIG. 5 proceeds to block 512.

At block 512, the example projection controller 132 of the example projector 108 of FIG. 1 positions the projection source of the projector (e.g., the projection source 130 of the projector 108 of FIG. 1) to the determined target projection source position to project and/or display projected content (e.g., the projected content 164 of FIG. 1) onto the projection surface (e.g., the projection surface 166 of FIG. 1) (block 512). For example, the projection controller 132 of FIG. 1 may adjust, move and/or otherwise change the position and/or orientation of the projection source 130 of the projector 108 of FIG. 1 from a current position and/or orientation to the target position and/or orientation determined (e.g., at block 510) by the example projection source position determiner 128 of FIG. 1. Following block 512, control of the example program 500 of FIG. 5 proceeds to block 514.

At block 514, the example light source location determiner 134 of the example shadow casting engine 110 of FIG. 1 identifies, detects and/or determines the location of a light source (e.g., the location of the light source 138 of FIG. 1 defined by and/or associated with the light source location data 160 of FIG. 1) associated with the projection environment (e.g., the projection environment 168 of FIG. 1) (block 514). In some examples, the light source location determiner 134 of FIG. 1 may identify, detect and/or determine the location of the light source based on environment data (e.g., by querying and/or searching the environment data 148 of FIG. 1). In other examples, the light source location determiner 134 of FIG. 1 may identify, detect and/or determine the location of the light source by requesting that the light source and/or the example shadow caster 112 of FIG. 1 transmit the location of the light source to the light source location determiner 134 and/or the example memory 114 of FIG. 1, and/or by accessing light source location data (e.g., the light source location data 160 of FIG. 1) from the memory 114 of FIG. 1. Following block 514, control of the example program 500 of FIG. 5 proceeds to block 516.

At block 516, the example shutter position determiner 136 of the example shadow casting engine 110 of FIG. 1 identifies, detects and/or determines a target position of a shutter of a shadow caster (e.g., a target position of the shutter 142 of the shadow caster 112 of FIG. 1) based on the light source location (e.g., the light source location data 160 of FIG. 1) identified, detected and/or determined (e.g., at block 514) by the example light source location determiner 134 of FIG. 1, and based on the projection surface (e.g., the projection surface 166 of FIG. 1 defined by and/or associated with the projection surface data 156 of FIG. 1) identified, detected and/or determined (e.g., at block 508) by the example projection surface determiner 126 of FIG. 1 (block 516). In some examples, the shutter position determiner 136 of FIG. 1 generates shutter position data (e.g., the shutter position data 162 of FIG. 1) corresponding to the target position of the shutter 142 identified, detected and/or determined by the shutter position determiner 136. Following block 516, control of the example program 500 of FIG. 5 proceeds to block 518.

At block 518, the example shutter controller 144 of the example shadow caster 112 of FIG. 1 positions the shutter of the shadow caster (e.g., the shutter 142 of the shadow caster 112 of FIG. 1) to the determined target shutter position to project and/or cast a shadow (e.g., the cast shadow 170 of FIG. 1) onto the projection surface (e.g., the projection surface 166 of FIG. 1) around and/or over a portion (e.g., the entirety) of the projected content (e.g., the projected content 164 of FIG. 1) (block 518). For example, the shutter controller 144 of FIG. 1 may adjust, move and/or otherwise change the position and/or orientation of the shutter 142 of the shadow caster 112 of FIG. 1 from a current position and/or orientation to the target position and/or orientation determined (e.g., at block 516) by the example shutter position determiner 136 of FIG. 1. Following block 518, control of the example program 500 of FIG. 5 proceeds to block 520.

At block 520, the example controlled shadow casting apparatus 100 of FIG. 1 determines whether the example shutter controller 144 of the example shadow caster 112 of FIG. 1 is to continue controlling the cast shadow (e.g., the cast shadow 170 of FIG. 1) relative to the determined projection surface (e.g., the projection surface 166 of FIG. 1) (block 520). For example, the controlled shadow casting apparatus 100 of FIG. 1 may receive (e.g., from an external device and/or a user interface operatively coupled to the controlled shadow casting apparatus of FIG. 1) one or more signal(s), command(s) and/or instruction(s) indicating that the shutter controller 144 is to discontinue controlling the cast shadow relative to the determined projection surface. If the controlled shadow casting apparatus 100 of FIG. 1 determines at block 520 that the shutter controller 144 of FIG. 1 is to continue controlling the cast shadow relative to the determined projection surface, control of the example program 500 of FIG. 5 returns to block 502. If the controlled shadow casting apparatus 100 of FIG. 1 instead determines at block 520 that the shutter controller 144 of FIG. 1 is not to continue controlling the cast shadow relative to the determined projection surface, the example program 500 of FIG. 5 ends.

FIG. 6 is a flowchart representative of example machine readable instructions 600 that may be executed at the example controlled shadow casting apparatus 100 of FIG. 1 to process image data (e.g., the image data 146 of FIG. 1) to identify features of a projection environment (e.g., the projection environment 168 of FIG. 1). Example operations of blocks 602, 604, 606, 608, 610, 612, 614 and 616 of FIG. 6 may be used to implement block 504 of FIG. 5.

The example program 600 of FIG. 6 begins when the example environment determiner 118 of the example imaging engine 104 of FIG. 1 identifies, detects and/or determines, based on the image data (e.g., the image data 146 of FIG. 1), the existence and corresponding location(s) of one or more structural surface(s) associated with the projection environment (e.g., the projection environment 168 of FIG. 1) (block 602). In some examples, the environment determiner 118 of FIG. 1 identifies, detects and/or determines the existence and the corresponding location(s) of the structural surface(s) by executing one or more computer vision algorithm(s) and/or model(s) in relation to the image data (e.g., the image data 146 of FIG. 1). In some examples, the environment determiner 118 of FIG. 1 generates environment data (e.g., the environment data 148 of FIG. 1) corresponding to the structural surface(s) and corresponding location(s) identified, detected and/or determined by the environment determiner 118. Following block 602, control of the example program 600 of FIG. 6 proceeds to block 604.

At block 604, the example environment determiner 118 of the example imaging engine 104 of FIG. 1 determines whether the image data (e.g., the image data 146 of FIG. 1) includes an identifiable structure corresponding to a projector (e.g., the projector 108 of FIG. 1) (block 604). If the environment determiner 118 of FIG. 1 determines at block 604 that the image data includes an identifiable structure corresponding to a projector, control of the example program 600 of FIG. 6 proceeds to block 606. If the environment determiner 118 of FIG. 1 instead determines at block 604 that the image data does not include an identifiable structure corresponding to a projector, control of the example program 600 of FIG. 6 proceeds to block 608.

At block 606, the example environment determiner 118 of the example imaging engine 104 of FIG. 1 identifies, detects and/or determines, based on the image data (e.g., the image data 146 of FIG. 1), a location of the projector (e.g., the location of the projector 108 of FIG. 1) associated with the projection environment (e.g., the projection environment 168 of FIG. 1) (block 606). In some examples, the environment determiner 118 of FIG. 1 identifies, detects and/or determines the location of the projector by executing one or more computer vision algorithm(s) and/or model(s) in relation to the image data (e.g., the image data 146 of FIG. 1). In some examples, the environment determiner 118 of FIG. 1 generates environment data (e.g., the environment data 148 of FIG. 1) and/or projector location data (e.g., the projector location data 154 of FIG. 1) corresponding to the location of the projector identified, detected and/or determined by the environment determiner 118. Following block 606, control of the example program 600 of FIG. 6 proceeds to block 608.

At block 608, the example environment determiner 118 of the example imaging engine 104 of FIG. 1 determines whether the image data (e.g., the image data 146 of FIG. 1) includes an identifiable structure corresponding to a light source (e.g., the light source 138 of FIG. 1) (block 608). If the environment determiner 118 of FIG. 1 determines at block 608 that the image data includes an identifiable structure corresponding to a light source, control of the example program 600 of FIG. 6 proceeds to block 610. If the environment determiner 118 of FIG. 1 instead determines at block 608 that the image data does not include an identifiable structure corresponding to a light source, control of the example program 600 of FIG. 6 proceeds to block 612.

At block 610, the example environment determiner 118 of the example imaging engine 104 of FIG. 1 identifies, detects and/or determines, based on the image data (e.g., the image data 146 of FIG. 1), a location of the light source (e.g., the location of the light source 138 of FIG. 1) associated with the projection environment (e.g., the projection environment 168 of FIG. 1) (block 610). In some examples, the environment determiner 118 of FIG. 1 identifies, detects and/or determines the location of the light source by executing one or more computer vision algorithm(s) and/or model(s) in relation to the image data (e.g., the image data 146 of FIG. 1). In some examples, the environment determiner 118 of FIG. 1 generates environment data (e.g., the environment data 148 of FIG. 1) and/or light source location data (e.g., the light source location data 160 of FIG. 1) corresponding to the location of the light source identified, detected and/or determined by the environment determiner 118. Following block 610, control of the example program 600 of FIG. 6 proceeds to block 612.

At block 612, the example audience location determiner 120 of the example imaging engine 104 of FIG. 1 determines whether the image data (e.g., the image data 146 of FIG. 1) includes an identifiable audience (e.g., one or more audience member(s)) (block 612). If the audience location determiner 120 of FIG. 1 determines at block 612 that the image data includes an identifiable audience, control of the example program 600 of FIG. 6 proceeds to block 614. If the audience location determiner 120 of FIG. 1 instead determines at block 612 that the image data does not include an identifiable audience, the example program 600 of FIG. 6 ends and control returns to a calling function or process such as the example program 500 of FIG. 5.

At block 614, the example audience location determiner 120 of the example imaging engine 104 of FIG. 1 identifies, detects and/or determines, based on the image data (e.g., the image data 146 of FIG. 1), the existence and corresponding location(s) of one or more audience member(s) associated with the projection environment (e.g., the projection environment 168 of FIG. 1) (block 614). In some examples, the audience location determiner 120 of FIG. 1 identifies, detects and/or determines the existence and the corresponding location(s) of the audience member(s) by executing one or more computer vision algorithm(s) and/or model(s) in relation to the image data (e.g., the image data 146 of FIG. 1). In some examples, the audience location determiner 120 of FIG. 1 generates audience location data (e.g., the audience location data 150 of FIG. 1) corresponding to the audience member(s) and corresponding location(s) identified, detected and/or determined by the audience location determiner 120. Following block 614, control of the example program 600 of FIG. 6 proceeds to block 616.

At block 616, the example audience pose determiner 122 of the example imaging engine 104 of FIG. 1 identifies, detects and/or determines, based on the image data (e.g., the image data 146 of FIG. 1), corresponding poses(s) (e.g., bodily orientation(s)) of the audience member(s) associated with the projection environment (e.g., the projection environment 168 of FIG. 1) (block 616). In some examples, the audience pose determiner 122 of FIG. 1 identifies, detects and/or determines the corresponding pose(s) of the audience member(s) by executing one or more computer vision algorithm(s) and/or model(s) in relation to the image data (e.g., the image data 146 of FIG. 1). In some examples, the audience pose determiner 122 of FIG. 1 generates audience pose data (e.g., the audience pose data 152 of FIG. 1) corresponding to the audience pose(s) identified, detected and/or determined by the audience pose determiner 122. Following block 616, the example program 600 of FIG. 6 ends and control returns to a calling function or process such as the example program 500 of FIG. 5.

FIG. 7 is a flowchart representative of example machine readable instructions 700 that may be executed at the example controlled shadow casting apparatus 100 of FIG. 1 to determine a projection surface (e.g., the projection surface 166 of FIG. 1) based on identified projection environment features (e.g., identified features of the projection environment 168 of FIG. 1) and an identified projector location (e.g., an identified location of the projector 108 of FIG. 1). Example operations of blocks 702, 704, 706, 708, 710, 712, 714, 716 and 718 of FIG. 7 may be used to implement block 508 of FIG. 5.

The example program 700 of FIG. 7 begins when the example projection surface determiner 126 of the example projection engine 106 of FIG. 1 identifies, detects and/or determines one or more candidate projection surface(s) based on one or more identified structural surface(s) associated with a projection environment (e.g., the projection environment 168 of FIG. 1) (block 702). In some examples, the projection surface determiner 126 of FIG. 1 identifies, detects and/or determines a list and/or group of candidate projection surfaces based on, and/or corresponding to, the structural surface(s) included within the example environment data 148 of FIG. 1. For example, a list and/or group of candidate projection surfaces identified, detected and/or determined by the projection surface determiner 126 may include one or more wall surface(s), floor surface(s), countertop surface(s), cabinet surface(s), etc. corresponding to the various structural surface(s) identified, detected and/or determined by the environment determiner 118 of the imaging engine 104 of FIG. 1 and stored as the environment data 148 of FIG. 1. Following block 702, control of the example program 700 of FIG. 7 proceeds to block 704.

At block 704, the example projection surface determiner 126 of the example projection engine 106 of FIG. 1 selects a first candidate projection surface from among the determined candidate projection surface(s) (block 704). Following block 704, control of the example program 700 of FIG. 7 proceeds to block 706.

At block 706, the example projection surface determiner 126 of the example projection engine 106 of FIG. 1 determines whether a projection source of a projector (e.g., the projection source 130 of the projector 108 of FIG. 1) can be positioned to project content (e.g., the projected content 164 of FIG. 1) onto the selected candidate projection surface based on the location of the projector (e.g., the location of the projector 108 of FIG. 1) (block 706). For example, the projection surface determiner 126 may determine that projection capabilities (e.g., rotate, tilt, pan, and/or zoom capabilities) associated with the projection source 130 of the projector 108 of FIG. 1 and known by and/or accessible to the projection surface determiner 126 enable, based on the projector location data 154 of FIG. 1, the projection source 130 of the projector 108 to project and/or display content onto the selected candidate projection surface. If the projection surface determiner 126 of FIG. 1 determines at block 706 that the projection source of the projector cannot be positioned to project content onto the selected candidate projection surface, control of the example program 700 of FIG. 7 proceeds to block 708. If the projection surface determiner 126 of FIG. 1 instead determines at block 706 that the projection source of the projector can be positioned to project content onto the selected candidate projection surface, control of the example program 700 of FIG. 7 proceeds to block 712.

At block 708, the example projection surface determiner 126 of the example projection engine 106 of FIG. 1 determines whether all of the determined candidate projection surfaces have been analyzed by the projection surface determiner 126 (block 708). If the projection surface determiner 126 of FIG. 1 determines at block 708 that not all of the determined candidate projection surfaces have been analyzed, control of the example program 700 of FIG. 7 proceeds to block 710. If the projection surface determiner 126 of FIG. 1 instead determines at block 708 that all of the determined candidate projection surfaces have been analyzed, the example program 700 of FIG. 7 ends and control returns to a calling function or process such as block 502 of the example program 500 of FIG. 5.

At block 710, the example projection surface determiner 126 of the example projection engine 106 of FIG. 1 selects a next candidate projection surface (e.g., a candidate projection surface different from the first candidate projection surface, and/or different from any other previously-analyzed candidate projection surface) from among the determined candidate projection surface(s) (block 710). Following block 710, control of the example program 700 of FIG. 7 returns to block 706.

At block 712, the example projection surface determiner 126 of the example projection engine 106 of FIG. 1 determines whether an audience can view content to be projected (e.g., the projected content 164 of FIG. 1) onto the selected candidate projection surface based on the location of the audience and/or the pose of the audience (block 712). For example, the projection surface determiner 126 may determine, based on the audience location data 150 and/or the audience pose data 152 of FIG. 1, that the audience is located in a position and/or posed in a bodily orientation that enable(s) the audience to view the content to be projected by the projection source 130 of the projector 108 onto the selected candidate projection surface. If the projection surface determiner 126 of FIG. 1 determines at block 712 that the audience cannot view the content to be projected onto the selected candidate projection surface, control of the example program 700 of FIG. 7 proceeds to block 714. If the projection surface determiner 126 of FIG. 1 instead determines at block 712 that the audience can view the content to be projected onto the selected candidate projection surface, control of the example program 700 of FIG. 7 proceeds to block 718.

At block 714, the example projection surface determiner 126 of the example projection engine 106 of FIG. 1 determines whether all of the determined candidate projection surfaces have been analyzed by the projection surface determiner 126 (block 714). If the projection surface determiner 126 of FIG. 1 determines at block 714 that not all of the determined candidate projection surfaces have been analyzed, control of the example program 700 of FIG. 7 proceeds to block 716. If the projection surface determiner 126 of FIG. 1 instead determines at block 714 that all of the determined candidate projection surfaces have been analyzed, the example program 700 of FIG. 7 ends and control returns to a calling function or process such as block 502 of the example program 500 of FIG. 5.

At block 716, the example projection surface determiner 126 of the example projection engine 106 of FIG. 1 selects a next candidate projection surface (e.g., a candidate projection surface different from the first candidate projection surface, and/or different from any other previously-analyzed candidate projection surface) from among the determined candidate projection surface(s) (block 716). Following block 716, control of the example program 700 of FIG. 7 returns to block 706.

At block 718, the example projection surface determiner 126 of the example projection engine 106 of FIG. 1 identifies the selected candidate projection surface as the determined projection surface (e.g., the projection surface 166 of FIG. 1) onto which projected content (e.g., the projected content 164 of FIG. 1) is to be projected and/or displayed (block 718). Following block 718, the example program 700 of FIG. 7 ends and control returns to a calling function or process such as the example program 500 of FIG. 5.

Figure 8:
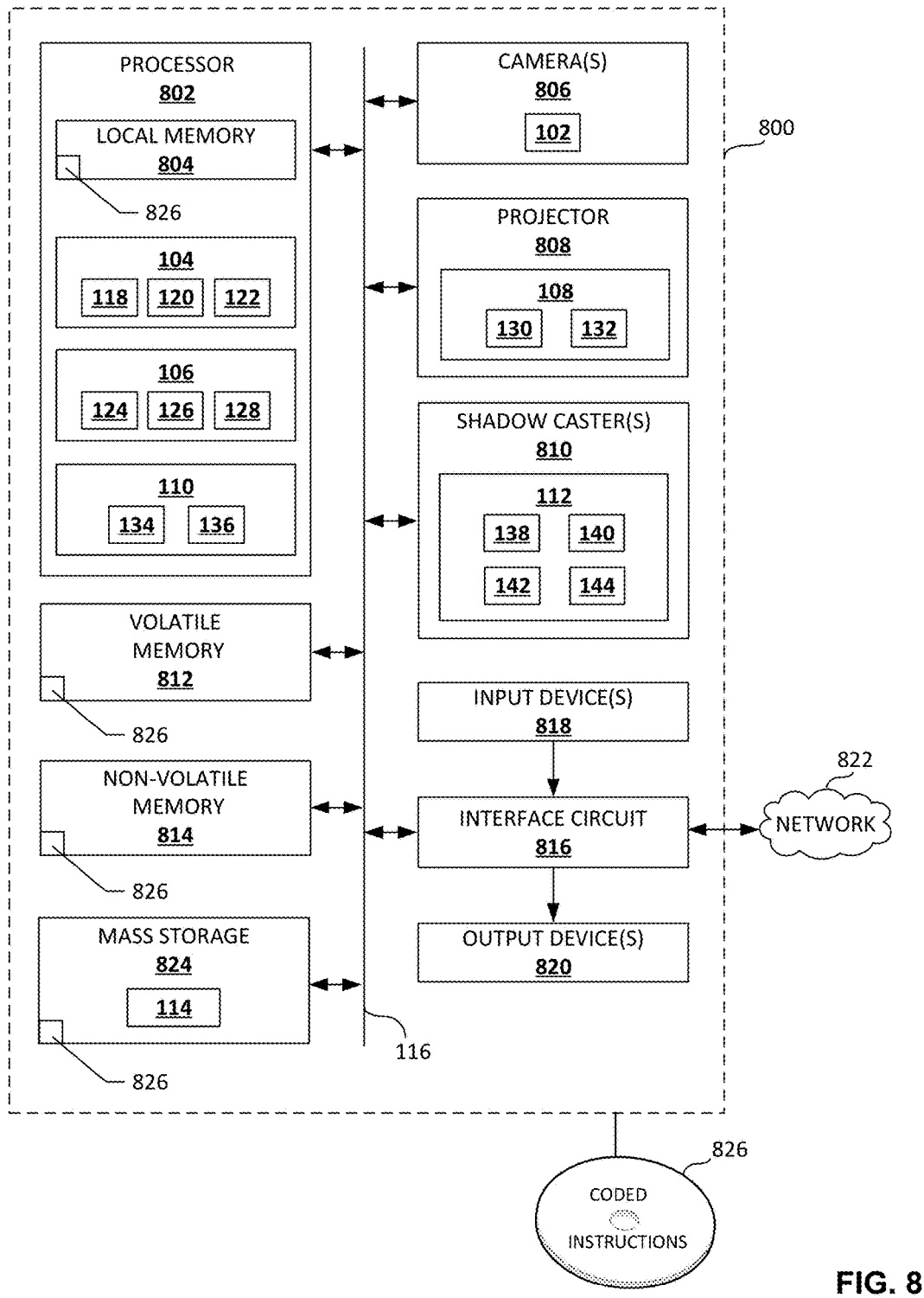
FIG. 8 is an example processor platform capable of executing the instructions of FIGS. 5-7 to implement the example controlled shadow casting apparatus of FIG. 1.

FIG. 8 is a block diagram of an example processor platform 800 capable of executing the example instructions of FIGS. 5-7 to implement the example controlled shadow casting apparatus 100 of FIG. 1. The processor platform 800 can be, for example, a server, a personal computer, a laptop computer, a mobile device (e.g., a cell phone, a smart phone, a tablet such as an iPad), or any other type of computing device.

The processor platform 800 of the illustrated example includes a processor 802. The processor 802 of the illustrated example is hardware. For example, the processor 802 can be implemented by one or more integrated circuits, logic circuits, microprocessors or controllers from any desired family or manufacturer. The hardware processor 802 may be a semiconductor based (e.g., silicon based) device. In the example of FIG. 8, the processor 802 implements the example imaging engine 104, the example projection engine 106, the example shadow casting engine 110, the example environment determiner 118, the example audience location determiner 120, the example audience pose determiner 122, the example projector location determiner 124, the example projection surface determiner 126, the example projection source position determiner 128, the example light source location determiner 134, and the example shutter position determiner 136 of FIG. 1. The processor 802 of the illustrated example also includes a local memory 804 (e.g., a cache).

The processor 802 of the illustrated example is in communication with one or more camera(s) 806 via the bus 116. In the illustrated example of FIG. 8, the camera(s) 806 is/are implemented as the example camera 102 of FIG. 1. The processor 802 of the illustrated example is also in communication with a projector 808 via the bus 116. In the illustrated example of FIG. 8, the projector 808 is implemented as the example projector 108 of FIG. 1 including the example projection source 130 and the example projection controller 132 of FIG. 1. The processor 802 of the illustrated example is also in communication with one or more shadow caster(s) 810 via the bus 116. In the illustrated example of FIG. 8, the shadow casters(s) 810 is/are implemented as the example shadow caster 112 of FIG. 1 including the example light source 138, the example dome 140, the example shutter 142, and the example shutter controller 144 of FIG. 1.

The processor 802 of the illustrated example is also in communication with a main memory including a volatile memory 812 and a non-volatile memory 814 via the bus 116. The volatile memory 812 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 814 may be implemented by flash memory and/or any other desired type of memory device. Access to the main memory 812, 814 is controlled by a memory controller.

The processor platform 800 of the illustrated example also includes an interface circuit 816. The interface circuit 816 may be implemented by any type of interface standard, such as an Ethernet interface, a universal serial bus (USB), and/or a PCI express interface.

In the illustrated example, one or more input device(s) 818 are connected to the interface circuit 816. The input device(s) 818 permit(s) a user to enter data and/or commands into the processor 802. The input device(s) 818 can be implemented by, for example, an audio sensor, a microphone, a camera (still or video), a keyboard, a button, a mouse, a touchscreen, a track-pad, a trackball, isopoint and/or a voice recognition system.

One or more output device(s) 820 are also connected to the interface circuit 816 of the illustrated example. The output device(s) 820 can be implemented, for example, by display devices (e.g., a light emitting diode (LED), an organic light emitting diode (OLED), a liquid crystal display, a cathode ray tube display (CRT), a projector, a touchscreen, a tactile output device, a printer and/or speakers). The interface circuit 816 of the illustrated example, thus, typically includes a graphics driver card, a graphics driver chip and/or a graphics driver processor.

The interface circuit 816 of the illustrated example also includes a communication device such as a transmitter, a receiver, a transceiver, a modem and/or network interface card to facilitate exchange of data with external machines (e.g., computing devices of any kind) via a network 822 (e.g., an Ethernet connection, a digital subscriber line (DSL), a telephone line, coaxial cable, a cellular telephone system, a wireless local area network (WLAN), etc.).

The processor platform 800 of the illustrated example also includes one or more mass storage device(s) 824 for storing software and/or data. Examples of such mass storage devices 824 include floppy disk drives, hard drive disks, compact disk drives, Blu-ray disk drives, RAID systems, and digital versatile disk (DVD) drives. In the illustrated example of FIG. 8, the mass storage device 824 includes the example memory 114 of FIG. 1.

Coded instructions 826 corresponding to the program(s) of FIGS. 5-7 may be stored in the mass storage device 824, in the local memory 804, in the volatile memory 812, in the non-volatile memory 814, and/or on a removable tangible computer readable storage medium such as a CD or DVD.

From the foregoing, it will be appreciated that example methods and apparatus have been disclosed for controlled shadow casting to increase the perceptual quality of projected content. The disclosed methods and apparatus for controlled shadow casting reduce (e.g., eliminate) many of the drawbacks associated with known methods for increasing the perceptual quality of projected content described above. For example, the disclosed methods and apparatus for controlled shadow casting advantageously increase the perceptual quality of projected content without the need for darkening the projection environment, without the need for increasing the intensity of the light projected by the projector, and without the need for increasing the reflective properties of any projections surfaces onto which the projected content is to be projected.

In some examples, an apparatus to increase a perceptual quality of content projected onto a projection surface is disclosed. In some disclosed examples, the apparatus comprises a shutter position determiner to determine a target shutter position for a shutter based on a location of a light source and a location of the projection surface. In some disclosed examples, the apparatus further comprises a shutter controller to move the shutter to the target shutter position to cast a shadow onto the projection surface around a portion of the content projected onto the projection surface.

In some disclosed examples of the apparatus, the shutter is to be located between the location of the light source and the location of the projection surface in response to the shutter being moved to the target shutter position by the shutter controller. In some disclosed examples, the shutter controller is to move the shutter along a surface of a dome.

In some disclosed examples, the apparatus further includes a projection source position determiner to determine a target projection source position for a projection source based on a location of a projector and the location of the projection surface. In some disclosed examples, the apparatus further includes a projection controller to move the projection source to the target projection source position to project the content onto the projection surface. In some disclosed examples of the apparatus, the projection source is to be directed toward the projection surface in response to the projection source being moved to the target projection source position by the projection controller.

In some disclosed examples, the apparatus further includes a projection surface determiner to identify the projection surface and the location of the projection surface. In some disclosed examples of the apparatus, the projection surface determiner is to identify the projection surface from among a plurality of candidate projection surfaces based on the location of the projector. In some disclosed examples, the candidate projection surfaces correspond to structural surfaces associated with a projection environment. In some disclosed examples, the structural surfaces are to be identified by an imaging engine based on image data associated with the projection environment.

In some disclosed examples of the apparatus, the projection surface determiner is to identify the projection surface based further on a location of an audience associated with the projection environment. In some disclosed examples, the location of the audience is to be identified by the imaging engine based on the image data. In some disclosed examples of the apparatus, the projection surface determiner is to identify the projection surface based further on a pose of the audience. In some disclosed examples, the pose of the audience is to be identified by the imaging engine based on the image data.

In some examples, one or more non-transitory machine-readable storage medium comprising instructions is disclosed. In some examples, the instructions, when executed, cause one or more processors to determine a target shutter position for a shutter based on a location of a light source and a location of a projection surface. In some examples, the instructions, when executed, further cause the one or more processors to move the shutter to the target shutter position to cast a shadow onto the projection surface around a portion of content projected onto the projection surface.

In some disclosed examples of the one or more non-transitory machine-readable storage medium, the shutter is to be located between the location of the light source and the location of the projection surface in response to the moving of the shutter to the target shutter position. In some disclosed examples, the shutter is to be moved to the target shutter position along a surface of a dome.

In some disclosed examples of the one or more non-transitory machine-readable storage medium, the instructions, when executed, further cause the one or more processors to determine a target projection source position for a projection source based on a location of a projector and the location of the projection surface. In some disclosed examples, the instructions, when executed, further cause the one or more processors to move the projection source to the target projection source position to project the content onto the projection surface. In some disclosed examples, the projection source is to be directed toward the projection surface in response to the moving of the projection source to the target projection source position.

In some disclosed examples of the one or more non-transitory machine-readable storage medium, the instructions, when executed, further cause the one or more processors to identify the projection surface and the location of the projection surface. In some disclosed examples, the instructions, when executed, further cause the one or more processors to identify the projection surface from among a plurality of candidate projection surfaces based on the location of the projector. In some disclosed examples, the candidate projection surfaces correspond to structural surfaces associated with a projection environment. In some disclosed examples, the structural surfaces are to be identified by an imaging engine based on image data associated with the projection environment.

In some disclosed examples of the one or more non-transitory machine-readable storage medium, the instructions, when executed, further cause the one or more processors to identify the projection surface based further on a location of an audience associated with the projection environment. In some disclosed examples, the location of the audience is to be identified by the imaging engine based on the image data. In some disclosed examples of the one or more non-transitory machine-readable storage medium, the instructions, when executed, further cause the one or more processors to identify the projection surface based further on a pose of the audience. In some disclosed examples, the pose of the audience is to be identified by the imaging engine based on the image data.

In some examples, a method for increasing a perceptual quality of content projected onto a projection surface is disclosed. In some disclosed examples, the method comprises determining, by executing a computer readable instruction with one or more processors, a target shutter position for a shutter based on a location of a light source and a location of the projection surface. In some disclosed examples, the method further comprises moving the shutter, via a shutter controller, to the target shutter position to cast a shadow onto the projection surface around a portion of the content projected onto the projection surface.

In some disclosed examples of the method, the shutter is to be located between the location of the light source and the location of the projection surface in response to the moving of the shutter to the target shutter position. In some disclosed examples, the moving of the shutter to the target shutter position includes moving the shutter along a surface of a dome.

In some disclosed examples, the method further includes determining, by executing a computer readable instruction with the one or more processors, a target projection source position for a projection source based on a location of a projector and the location of the projection surface. In some disclosed examples, the method further includes moving the projection source, via a projection controller, to the target projection source position to project the content onto the projection surface. In some disclosed examples, the projection source is to be directed toward the projection surface in response to the moving of the projection source to the target projection source position.

In some disclosed examples, the method further includes identifying, by executing a computer readable instruction with the one or more processors, the projection surface and the location of the projection surface. In some disclosed examples, the identifying of the projection surface includes identifying the projection surface from among a plurality of candidate projection surfaces based on the location of the projector. In some disclosed examples, the candidate projection surfaces correspond to structural surfaces associated with a projection environment. In some disclosed examples, the structural surfaces are identified by an imaging engine based on image data associated with the projection environment.

In some disclosed examples of the method, the identifying of the projection surface is further based on a location of an audience associated with the projection environment. In some disclosed examples, the location of the audience is identified by the imaging engine based on the image data. In some disclosed examples of the method, the identifying of the projection surface is further based on a pose of the audience. In some disclosed examples, the pose of the audience is identified by the imaging engine based on the image data.

In some examples, an apparatus to increase a perceptual quality of content projected onto a projection surface is disclosed. In some disclosed examples, the apparatus comprises means for determining a target shutter position for a shutter based on a location of a light source and a location of the projection surface. In some disclosed examples, the apparatus further comprises means for moving the shutter to the target shutter position to cast a shadow onto the projection surface around a portion of the content projected onto the projection surface.

In some disclosed examples of the apparatus, the shutter is to be located between the location of the light source and the location of the projection surface in response to the shutter being moved to the target shutter position by the means for moving the shutter. In some disclosed examples, the means for moving the shutter is to move the shutter along a surface of a dome.

In some disclosed examples, the apparatus further includes means for determining a target projection source position for a projection source based on a location of a projector and the location of the projection surface. In some disclosed examples, the apparatus further includes means for moving the projection source to the target projection source position to project the content onto the projection surface. In some disclosed examples, the projection source is to be directed toward the projection surface in response to the projection source being moved to the target projection source position by the means for moving the projection source.

In some disclosed examples, the apparatus further includes means for identifying the projection surface and the location of the projection surface. In some disclosed examples, the means for identifying the projection surface is to identify the projection surface from among a plurality of candidate projection surfaces based on the location of the projector. In some disclosed examples, the candidate projection surfaces correspond to structural surfaces associated with a projection environment. In some disclosed examples, the structural surfaces are to be identified by an image processing means based on image data associated with the projection environment.

In some disclosed examples of the apparatus, the means for identifying the projection surface is to identify the projection surface based further on a location of an audience associated with the projection environment. In some disclosed examples, the location of the audience is to be identified by the imaging processing means based on the image data. In some disclosed examples of the apparatus, the means for identifying the projection surface is to identify the projection surface based further on a pose of the audience. In some disclosed examples, the pose of the audience is to be identified by the imaging processing means based on the image data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to increase a perceptual quality of content projected onto a projection surface, the apparatus comprising:
a shutter position determiner to determine a target shutter position for a shutter based on a location of a light source and a location of the projection surface; and
a shutter controller to move the shutter to the target shutter position to cast a shadow onto the projection surface around a portion of the content projected onto the projection surface.

2. The apparatus as defined in claim 1, wherein the shutter is to be located between the location of the light source and the location of the projection surface in response to the shutter being moved to the target shutter position by the shutter controller.

3. The apparatus as defined in claim 1, wherein the shutter controller is to move the shutter along a surface of a dome.

4. The apparatus as defined in claim 1, further including:
a projection source position determiner to determine a target projection source position for a projection source based on a location of a projector and the location of the projection surface; and
a projection controller to move the projection source to the target projection source position to project the content onto the projection surface.

5. The apparatus as defined in claim 4, wherein the projection source is to be directed toward the projection surface in response to the projection source being moved to the target projection source position by the projection controller.

6. The apparatus as defined in claim 4, further including a projection surface determiner to identify the projection surface and the location of the projection surface.

7. The apparatus as defined in claim 6, wherein the projection surface determiner is to identify the projection surface from among a plurality of candidate projection surfaces based on the location of the projector.

8. The apparatus as defined in claim 7, wherein the candidate projection surfaces correspond to structural surfaces associated with a projection environment, the structural surfaces to be identified by an imaging engine based on image data associated with the projection environment.

9. The apparatus as defined in claim 8, wherein the projection surface determiner is to identify the projection surface based further on a location of an audience associated with the projection environment, the location of the audience to be identified by the imaging engine based on the image data.

10. The apparatus as defined in claim 9, wherein the projection surface determiner is to identify the projection surface based further on a pose of the audience, the pose of the audience to be identified by the imaging engine based on the image data.

11. At least one non-transitory machine-readable storage medium comprising instructions that, when executed, cause one or more processors to at least:
determine a target shutter position for a shutter based on a location of a light source and a location of a projection surface; and
move the shutter to the target shutter position to cast a shadow onto the projection surface around a portion of content projected onto the projection surface.

12. The at least one non-transitory machine-readable storage medium as defined in claim 11, wherein the instructions, when executed, further cause the one or more processors to:
determine a target projection source position for a projection source based on a location of a projector and the location of the projection surface; and
move the projection source to the target projection source position to project the content onto the projection surface.

13. The at least one non-transitory machine-readable storage medium as defined in claim 12, wherein the instructions, when executed, further cause the one or more processors to identify the projection surface and the location of the projection surface.

14. The at least one non-transitory machine-readable storage medium as defined in claim 13, wherein the instructions, when executed, further cause the one or more processors to identify the projection surface from among a plurality of candidate projection surfaces based on the location of the projector.

15. The at least one non-transitory machine-readable storage medium as defined in claim 14, wherein the candidate projection surfaces correspond to structural surfaces associated with a projection environment, the structural surfaces to be identified by an imaging engine based on image data associated with the projection environment.

16. A method for increasing a perceptual quality of content projected onto a projection surface, the method comprising:
- determining, by executing a computer readable instruction with one or more processors, a target shutter position for a shutter based on a location of a light source and a location of the projection surface; and
- moving the shutter, via a shutter controller, to the target shutter position to cast a shadow onto the projection surface around a portion of the content projected onto the projection surface.

17. The method as defined in claim 16, further including:
- determining, by executing a computer readable instruction with the one or more processors, a target projection source position for a projection source based on a location of a projector and the location of the projection surface; and
- moving the projection source, via a projection controller, to the target projection source position to project the content onto the projection surface.

18. The method as defined in claim 17, further including identifying, by executing a computer readable instruction with the one or more processors, the projection surface and the location of the projection surface.

19. The method as defined in claim 18, wherein the identifying of the projection surface includes identifying the projection surface from among a plurality of candidate projection surfaces based on the location of the projector.

20. The method as defined in claim 19, wherein the candidate projection surfaces correspond to structural surfaces associated with a projection environment, the structural surfaces being identified by an imaging engine based on image data associated with the projection environment.

* * * * *